(12) United States Patent
Buckley

(10) Patent No.: US 11,508,285 B2
(45) Date of Patent: Nov. 22, 2022

(54) SYSTEMS AND METHODS FOR SPATIO-TEMPORAL DITHERING

(71) Applicant: Meta Platforms Technologies, LLC, Menlo Park, CA (US)

(72) Inventor: Edward Buckley, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 443 days.

(21) Appl. No.: 16/520,031

(22) Filed: Jul. 23, 2019

(65) Prior Publication Data

US 2021/0027694 A1 Jan. 28, 2021

(51) Int. Cl.
*G09G 3/20* (2006.01)
*G02B 27/10* (2006.01)

(52) U.S. Cl.
CPC ....... *G09G 3/2055* (2013.01); *G02B 27/1026* (2013.01); *G09G 3/2074* (2013.01)

(58) Field of Classification Search
CPC .. G09G 3/2055; G09G 3/2074; G09G 3/2029; G09G 3/2044; G09G 3/2051; G09G 3/3466; G09G 5/10; G09G 2310/0235; G09G 2320/0233; G09G 2320/0242; G09G 3/2066; G09G 2360/16; G02B 27/1026

See application file for complete search history.

(56) References Cited

U.S. PATENT DOCUMENTS

| 2013/0011076 A1* | 1/2013 | Obzhirov | H04N 19/34 382/251 |
| 2015/0287354 A1* | 10/2015 | Wang | G09G 3/2003 345/598 |
| 2017/0278447 A1* | 9/2017 | Yaras | G09G 3/2044 |

FOREIGN PATENT DOCUMENTS

WO   WO 2020033008 A1   2/2020

OTHER PUBLICATIONS

International Search Report and Written Opinion for International Application No. PCT/US2020/04243, dated Dec. 3, 2020.

\* cited by examiner

*Primary Examiner* — Nelson M Rosario
(74) *Attorney, Agent, or Firm* — Baker Botts L.L.P.

(57) ABSTRACT

In one embodiment, the system may receive a target pixel value for a pixel of an image of a series of images. The system may determine an error-modified target pixel value based on the target pixel value and a first error value. The system may generate a quantized pixel value corresponding to the error-modified target pixel value for display by the pixel of the image. The system may determine an aggregated representation of quantized pixel values displayed by the pixel of the image and corresponding pixels of one or more preceding images of the series of images. The system may determine a second error value based on the aggregated representation of the quantized pixel values and the first error-modified target pixel value. The system may dither at least a portion of the second error value to at least a corresponding pixel of a next image in the series of images.

19 Claims, 18 Drawing Sheets

SYSTEMS AND METHODS FOR SPATIO-TEMPORAL DITHERING

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a spatio-temporal dithering method for generating a series of subframe images with more even luminance distribution across all subframe images for better representing a target image which has a larger number of gray levels or color depth than the subframe images. For a given target pixel value of a pixel, the system may firstly generate an error-modified target pixel value based on the target pixel value and a first quantization error value dithered from the preceding subframe image. The error-modified target pixel value may be determined by adding the first quantization error value to the target pixel value. Then, the system may determine a corrected target pixel value by projecting the error-modified target pixel value to a display gamut to make sure the corrected target pixel value to be within a valid range as determined by the display gamut. Then, the system may use a vector quantizer or a scalar quantizer to quantize the corrected target pixel value by mapping the corrected target pixel value to a pixel value range as determined by the gray level or color depth of the subframe images. The quantized pixel value may be used for display by the pixel of the current subframe image. After that, the system may determine an aggregated representation of a number of quantized pixel values displayed by the current pixel of the current subframe image and corresponding pixels of all preceding subframe images (if there are preceding subframe images). Then, the system may calculate the quantization error value by subtracting the aggregated representation of the quantized pixel values from the error-modified target pixel value. The quantization error may be fed/dithered to the next subframe image for determining the error-modified target pixel value of the corresponding pixel of the next subframe image of the series of subframe images. For example, the quantization error may be fed to a Floyd-Steinberg model for calculating the spatial dithering errors for each of four neighboring pixels of the current pixel. One of the spatial dithering errors may be fed to the next subframe image temporally and the remaining spatial dithering errors may be distributed spatially to the neighboring pixels of the same subframe image. As a result, the method may temporally distribute the quantization errors among the subframes so that the temporal energy or luminance remains substantially even across all-subframes, and at the same time, spatially distribute the quantization errors within the current subframe image, and therefore dramatically improves the display quality in AR/VR systems. In particular embodiments, the system may use a color display model to generate display pixel values and determine the quantization error based on the display pixel values instead of the quantized pixel values.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment, a method may comprise, by a computing system:
  receiving a target pixel value for a pixel of an image of a series of images;
  determining a first error-modified target pixel value based on the target pixel value and a first error value;
  generating a quantized pixel value corresponding to the error-modified target pixel value, wherein the quantized pixel value is used for display by the pixel of the image;
  determining a first aggregated representation of a plurality of quantized pixel values displayed by: (1) the pixel of the image and (2) corresponding pixels of one or more preceding images of the series of images;
  determining a second error value based on the first aggregated representation of the plurality of quantized pixel values and the first error-modified target pixel value; and
  dithering at least a portion of the second error value to at least a corresponding pixel of a next image in the series of images.

The series of images may be used to represent a target image, and the target pixel value may correspond to a corresponding pixel value of the target image.

The target pixel value may equal to the corresponding pixel value of the target image, and the first aggregated representation of the plurality of quantized pixel values may be an average of the plurality of quantized pixel values.

The target pixel value may equal to a result of multiplying the corresponding pixel value of the target image by a sequential number associated with the image of the series of images, and the first aggregated representation of the plurality of quantized pixel values may be a sum of the plurality of quantized pixel values.

The series of images may comprise N number of images, each of the series of images may have K-bit gray level bits, and the target image may have M-bit gray level bits and the series of images and the target image may have a relationship of $2^M = N \times 2^K$.

In an embodiment, a method may comprise:
determining a corrected target pixel value by projecting the first error-modified target pixel value to a display gamut, wherein the quantized pixel value is generated based on the corrected target pixel value.

The projection of the first error-modified target pixel value to the display gamut may comprise clipping the first error-modified target pixel value to a value range associated with the display gamut.

The quantized pixel value may be determined by mapping the corrected target pixel value to a pixel value range as determined by the K-bit gray level bits, and the quantized pixel value may be a closest K-bit binary number to the corrected target pixel value.

The second error value may be determined by subtracting the aggregated representation of the plurality of quantized pixel values from the first error-modified target pixel value.

The at least one portion of the second error value may be dithered to the corresponding pixel of the next image of the series of images by being used for determining a second error-modified target pixel value for the corresponding pixel of the next image of the series of images.

The first error value may be zero when the image is a first image of the series of images.

The first error value may be a preceding error value from the corresponding pixel of a preceding image when the image is a subsequent image of the series of subframe images.

In an embodiment, a method may comprise:
determining, using a spatio-dithering model, one or more spatial error values based on the second error value, wherein the one or more spatial error values comprise a first spatial error value for a first adjacent pixel which is in a same row and a next column to the pixel, a second spatial error value for a second adjacent pixel which is in a next row and a preceding column to the pixel, a third spatial error value for a third adjacent pixel which is in the next row and a same column to the pixel, and a fourth spatial error value for a fourth adjacent pixel which is in the next row and the next column to the pixel.

The spatio-dithering model may comprise a Floyd-Steinberg kernel.

The first spatial error value may be dithered in a time domain to the corresponding pixel of the next image of the series of images.

The first spatial error value may be dithered in the time domain to the corresponding pixel of the next image by being used for determining a second error-modified target pixel value for the corresponding pixel of the next image of the series of images.

The second, third and fourth spatial error values may be dithered in a spatial domain to the second, third and fourth adjacent pixels within the image.

In an embodiment, a method may comprise:
determining, using a color display model, a display pixel value based on the quantized pixel value for display by the pixel of the image; and
determining, a second aggregated representation of the plurality of display pixel values displayed by: (1) the pixel of the image and (2) the corresponding pixels of one or more preceding images of the series of images, wherein the second error value is determined by subtracting the second aggregated representation of the plurality of display pixel values from the first error-modified target pixel value.

In an embodiment, one or more computer-readable non-transitory storage media may embody software that is operable when executed to:
receiving a target pixel value for a pixel of an image of a series of images;
determining a first error-modified target pixel value based on the target pixel value and a first error value;
generating a quantized pixel value corresponding to the error-modified target pixel value, wherein the quantized pixel value is used for display by the pixel of the image;
determining a first aggregated representation of a plurality of quantized pixel values displayed by: (1) the pixel of the image and (2) corresponding pixels of one or more preceding images of the series of images;
determining a second error value based on the first aggregated representation of the plurality of quantized pixel values and the first error-modified target pixel value; and
dithering at least a portion of the second error value to at least a corresponding pixel of a next image in the series of images.

In an embodiment, a system may comprise:
a first digital electronic circuit configured to determine one or more areas of an artificial reality scene, wherein the one or more areas are visible from a current viewpoint of a user;
a second digital electronic circuit configured to determine a pixel value for each of a plurality of pixels associated with the one or more areas; and
a third digital electronic circuit configured to dither quantization errors associated with the plurality of pixels, wherein the quantization errors are dithered both spatially to one or more neighboring pixels within a current frame and temporally to a next frame.

In an embodiment, a system may comprise:
a memory unit configured to store source data of different resolutions, the pixel values of the plurality of pixels associated with the one or more areas are determined based on the source data of different resolutions.

In an embodiment, a system may comprise:
a display system comprising a plurality of micro-LED pixels of three color channels, three display driver circuits for driving the plurality of micro-LED pixels of respective color channels, and one or more data buses connecting the third digital electronic circuit to the three display driver circuits.

The display system may comprise a light source assembly, a plurality of decoupling elements, and a plurality of output waveguides coupling the light source assembly to the plurality of decoupling elements.

The display system may comprise a light source comprising a plurality of light emitters emitting a plurality of light beams, a plurality of display pixels in an image filed, and a rotatable mirror reflecting the plurality of light beams to the plurality of display pixels in the image field.

The display system may comprise a projector device emitting a plurality of light beams, a waveguide comprising a plurality of coupling elements and a plurality of decoupling elements distributed along the waveguide, the plurality of coupling elements and the plurality of decoupling elements may reflect a first portion of light intensity of the plurality of light beams along the waveguide, and the plurality of decoupling elements may decouples a second portion of light intensity of the plurality of light beams from the waveguide.

DESCRIPTION OF EXAMPLE EMBODIMENTS

The number of available bits in a display may limit the display's color depth or gray scale level. Displays with limited color depth or gray scale level may use spatial dithering to generate the illusion of increased color depth or gray scale level, for example, by spreading quantization errors to neighboring pixels. To further increase the color depth or gray scale level, displays may generate a series of temporal subframe images with less gray level bits to give the illusion of a target image which has more gray level bits. Each subframe image may be assigned a color intensity range and dithered using spatial dithering techniques. However, using this method, even though the average luminance of the all subframe images over time is approximately equal to the target image, the subframes may have very different luminance and will create temporal artifacts (e.g., flashes or uneven luminance over time) in AR/VR display because the user's eyes and head positions may change dramatically between the subframe images.

To solve this problem, particular embodiments of the system may use a spatio-temporal dithering method to generate a series of subframe images for representing a target image with more even luminance distribution across all subframe images. The spatio-temporal dithering method may dither quantization errors both spatially to neighboring pixels of the same subframe image and temporally to the corresponding pixel of next subframe image of the series of subframe images. The temporally dithered quantization error of a pixel of a subframe image may be dithered to the corresponding pixel in the next subframe image of the series of subframe images in the time domain.

Particular embodiments of the system provide better image quality and improved user experience for AR/VR display by using multiple subframe images with less color depth to represent an image with greater color depth. Particular embodiments of the system generate subframe images with more even luminance distribution across the subframe images for representing the target image and eliminate the temporal artifacts such as flashes or uneven luminance over time in AR/VR display when the user's eyes and head positions change between the subframe images. Particular embodiments of the system allow AR/VR display system to reduce the space and complexity of pixel circuits, and therefore miniaturize the size of the display system. Particular embodiments of the system make it possible for AR/VR displays to eliminate analog pixel circuits for full RGB operations and provide more flexibility upon pixel design of AR/VR displays.

Figure 1A:
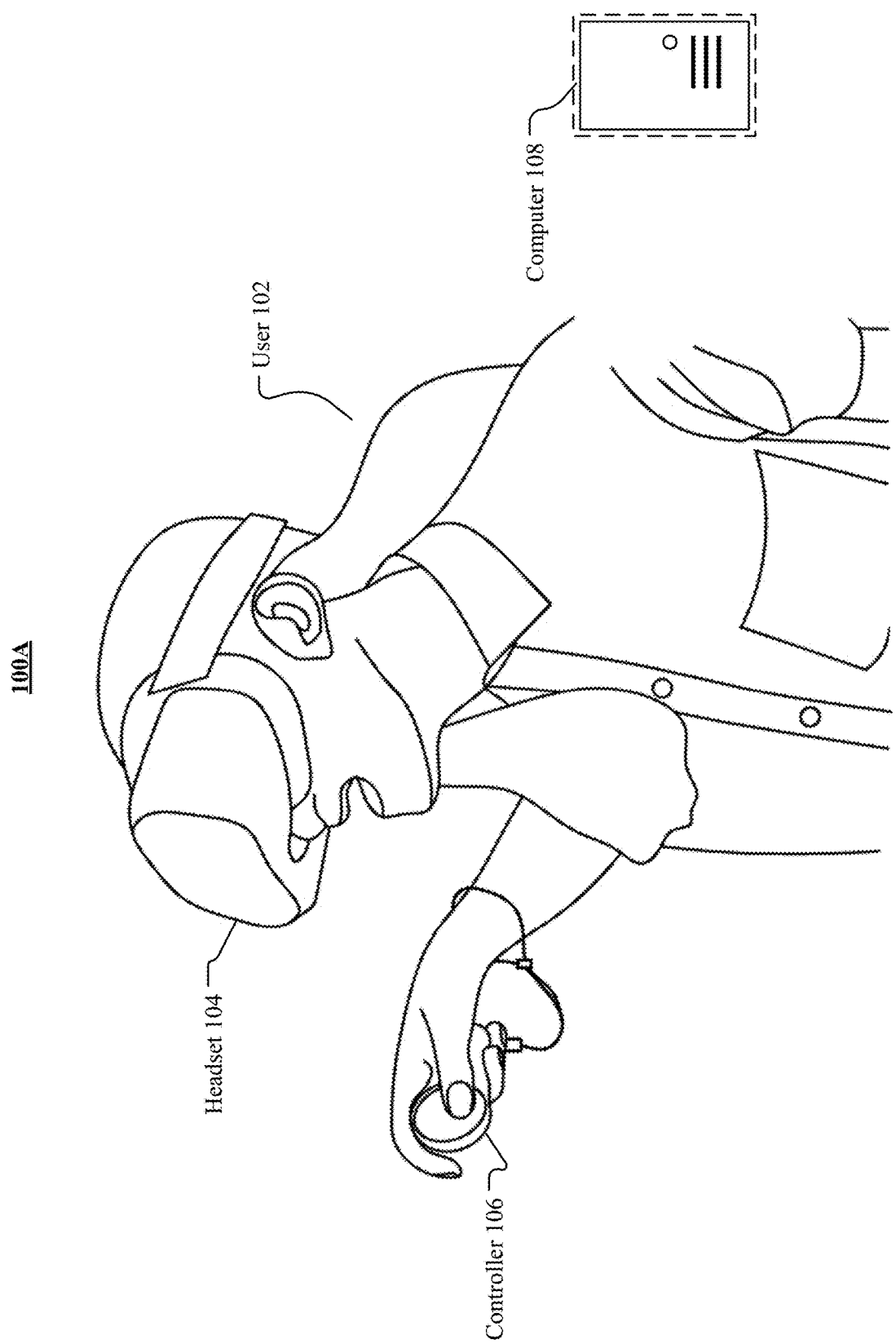
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
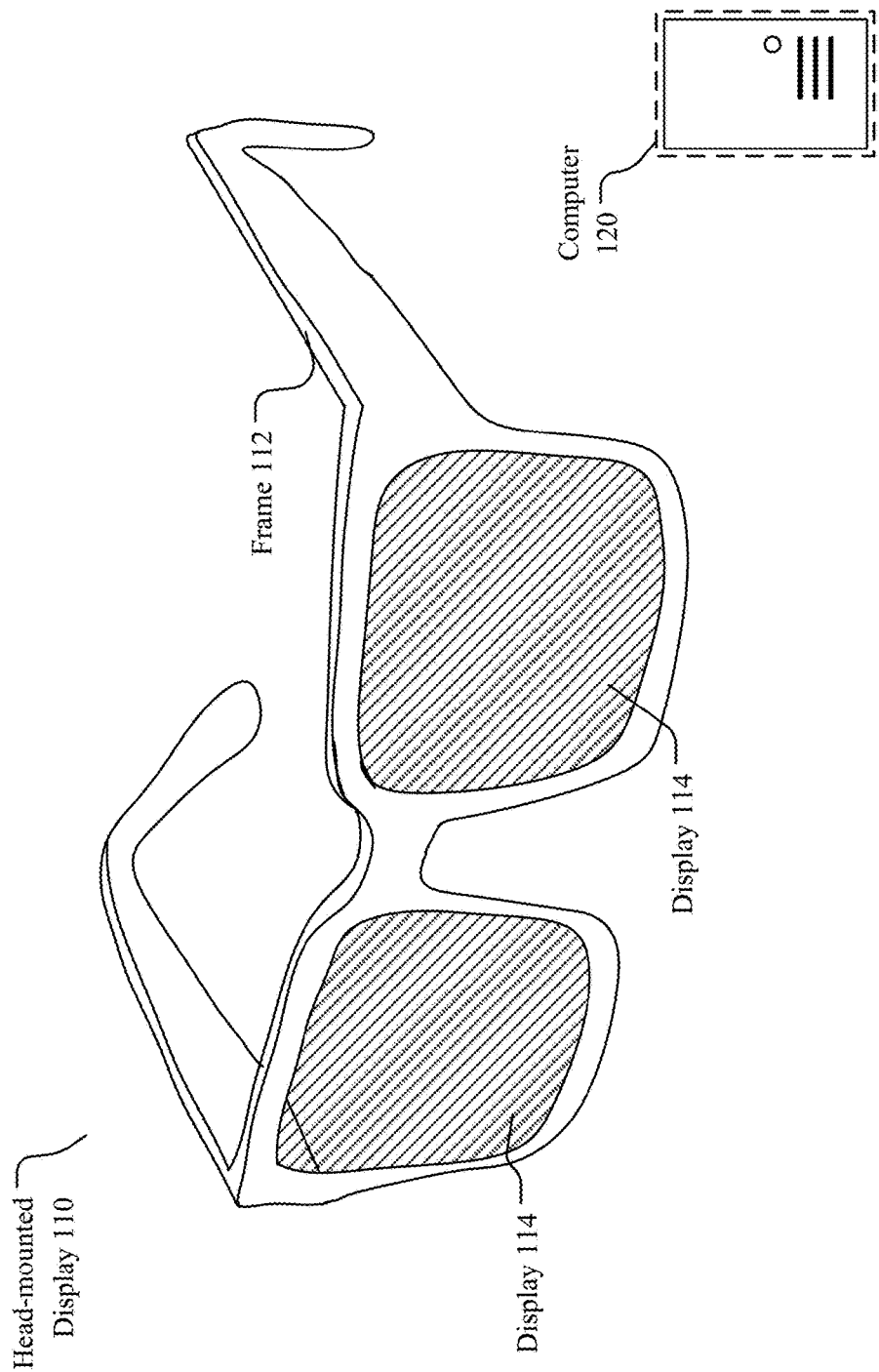
FIG. 1B illustrates an example augmented reality system.

FIG. 1B illustrates an example augmented reality system 100B. The augmented reality system 100 may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
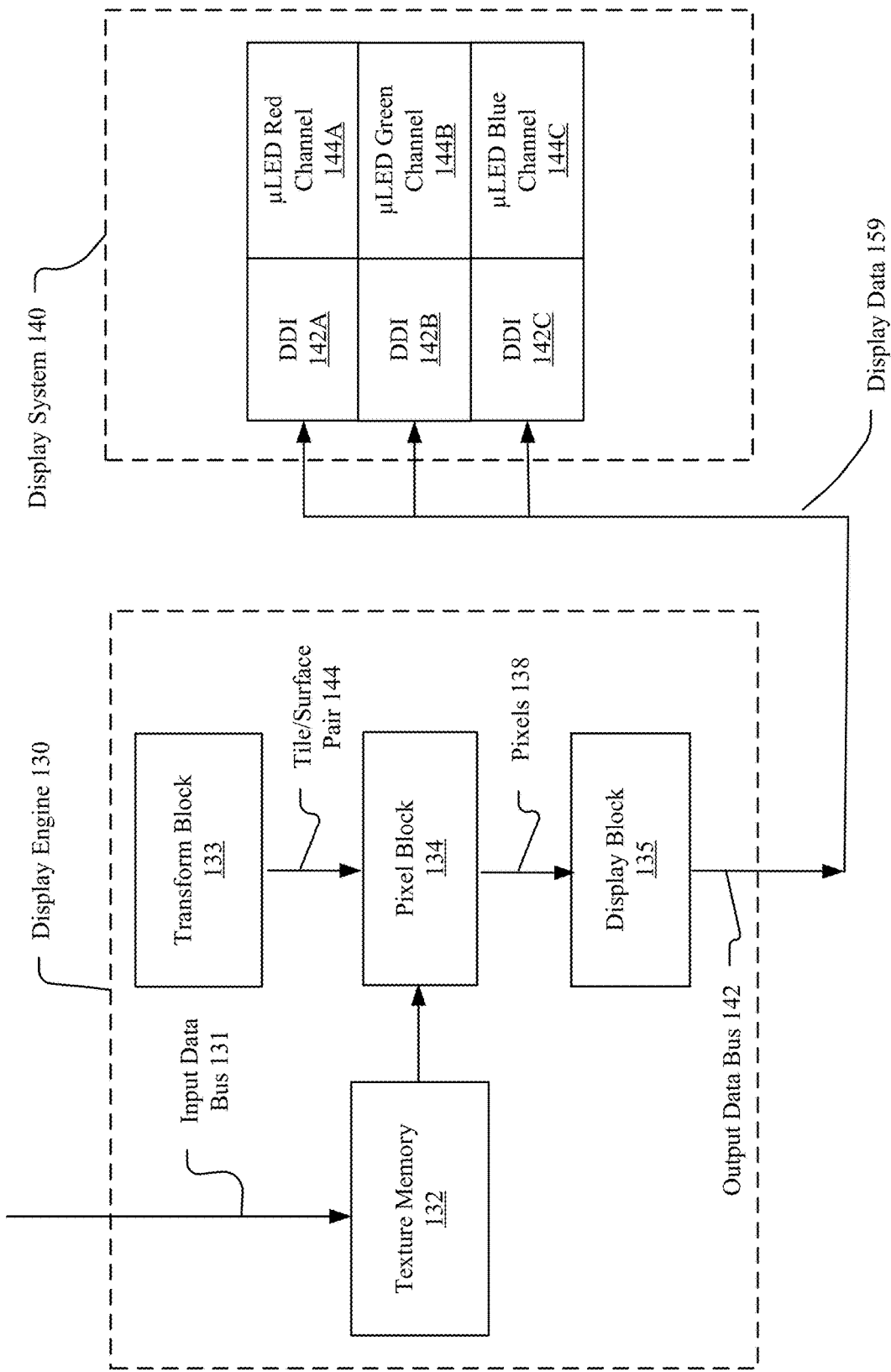
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (pLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
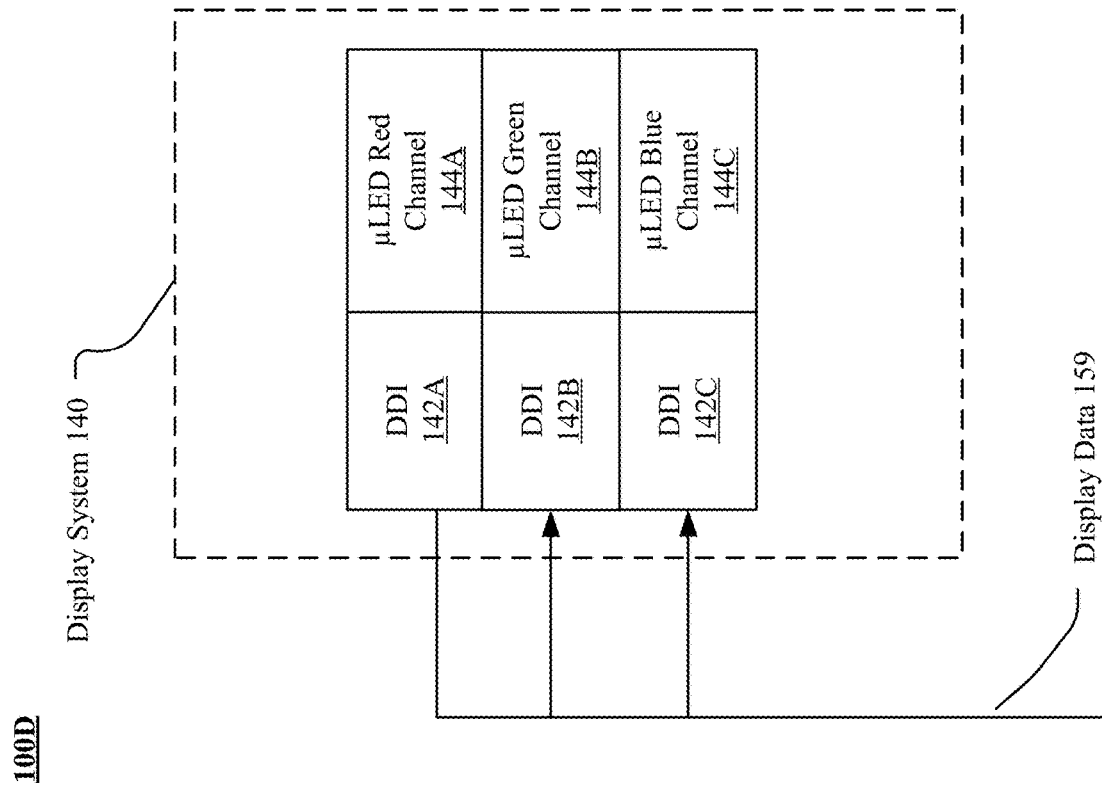
FIG. 1D illustrates an example graphic pipeline of the display engine for generating display image data.
Figure 1D:
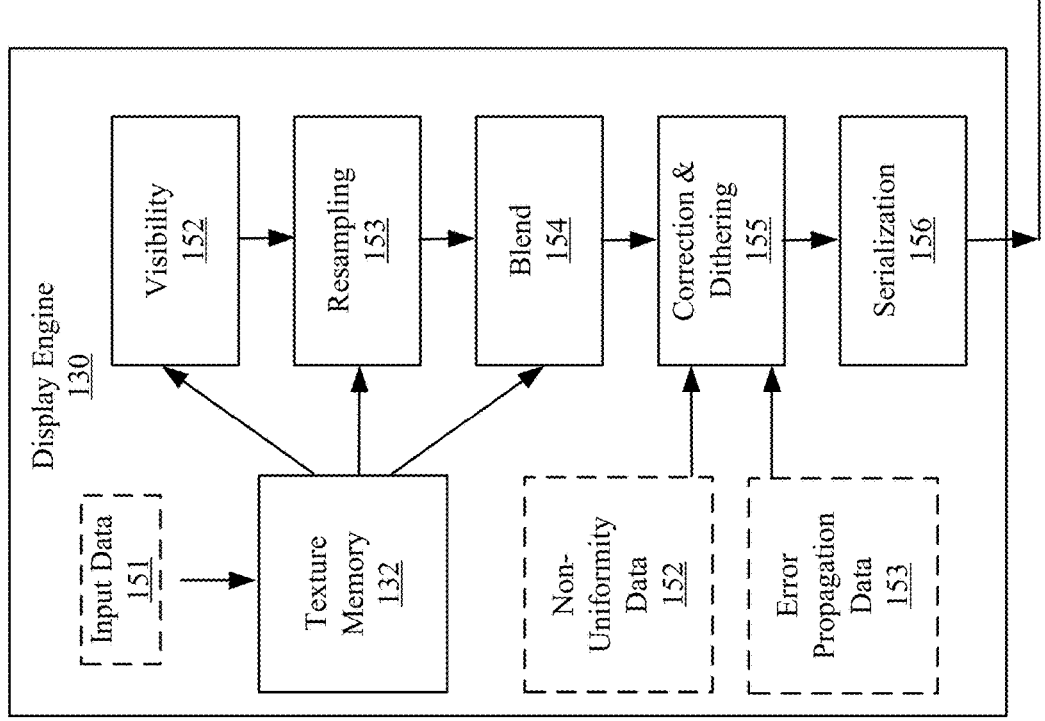

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
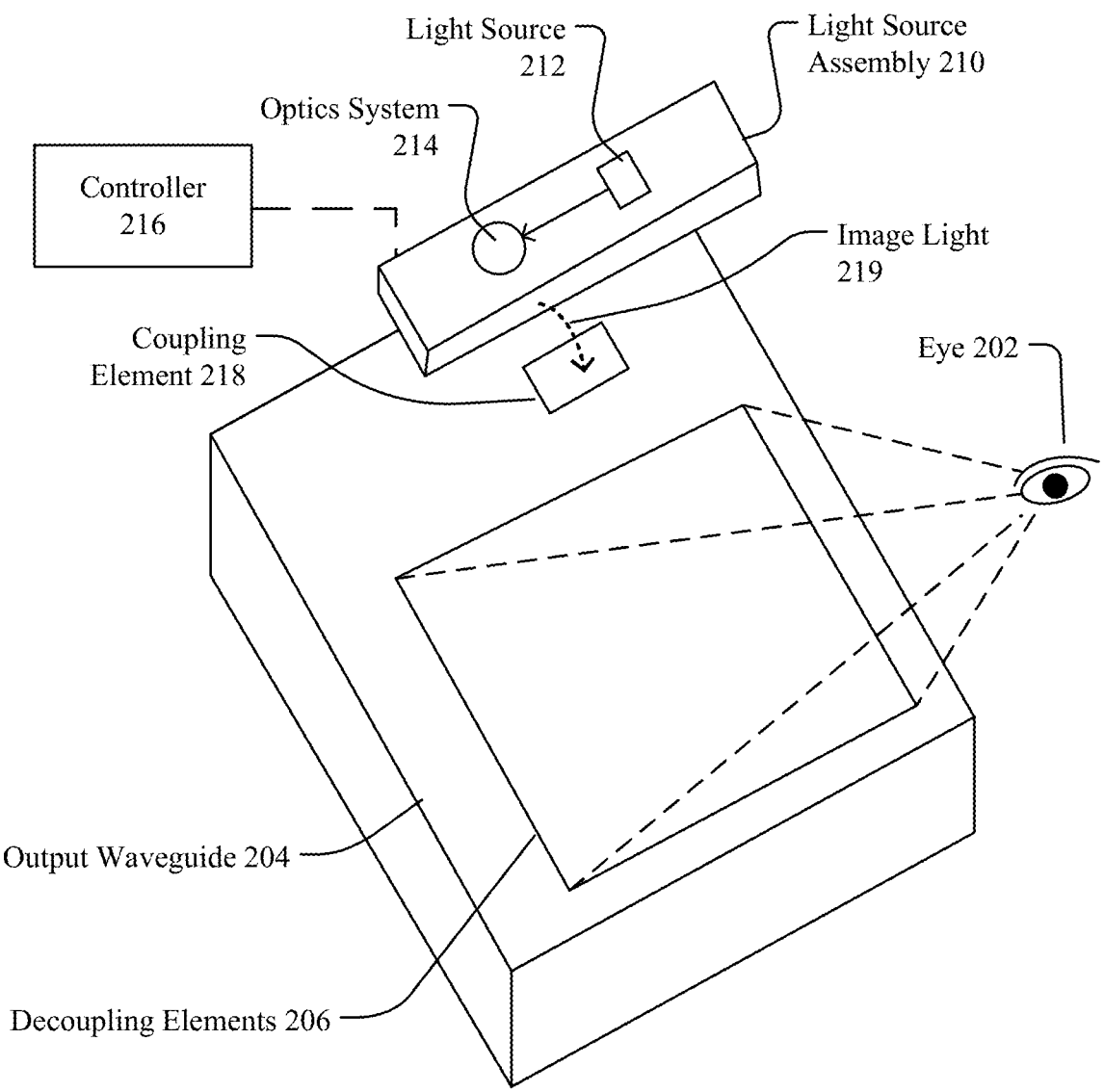
FIG. 2A illustrates an example scanning waveguide display.
Figure 3A:
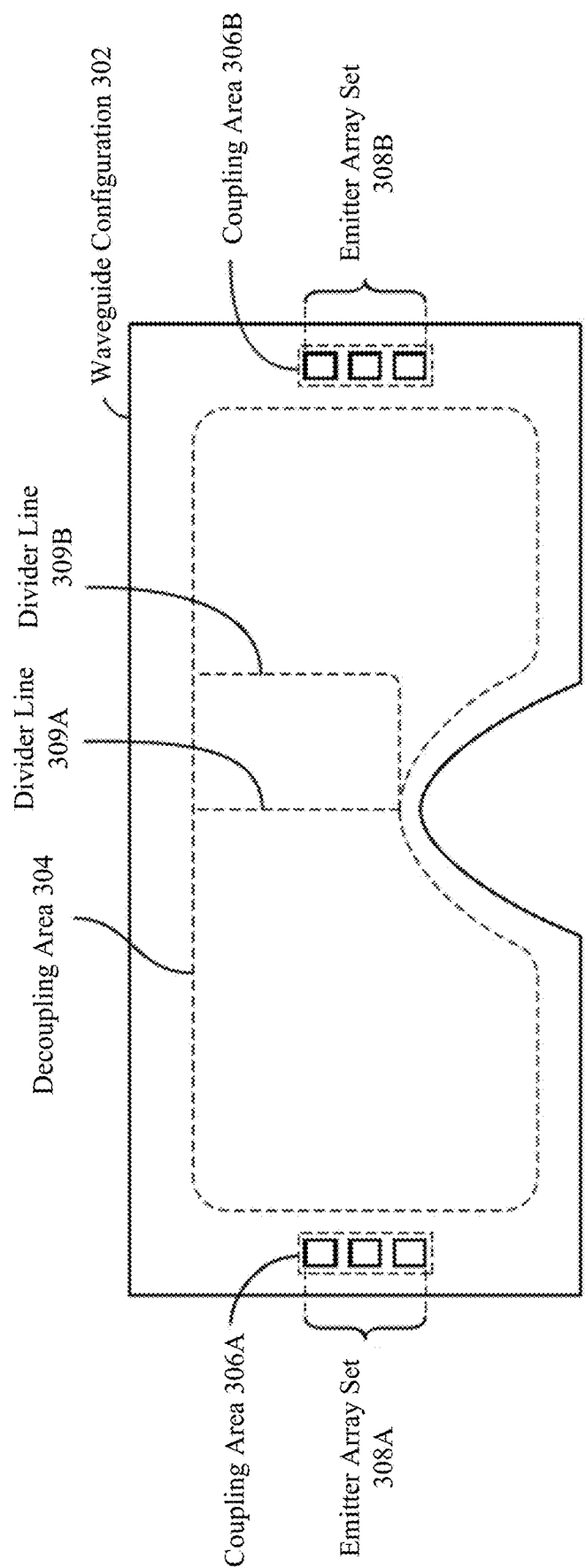
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
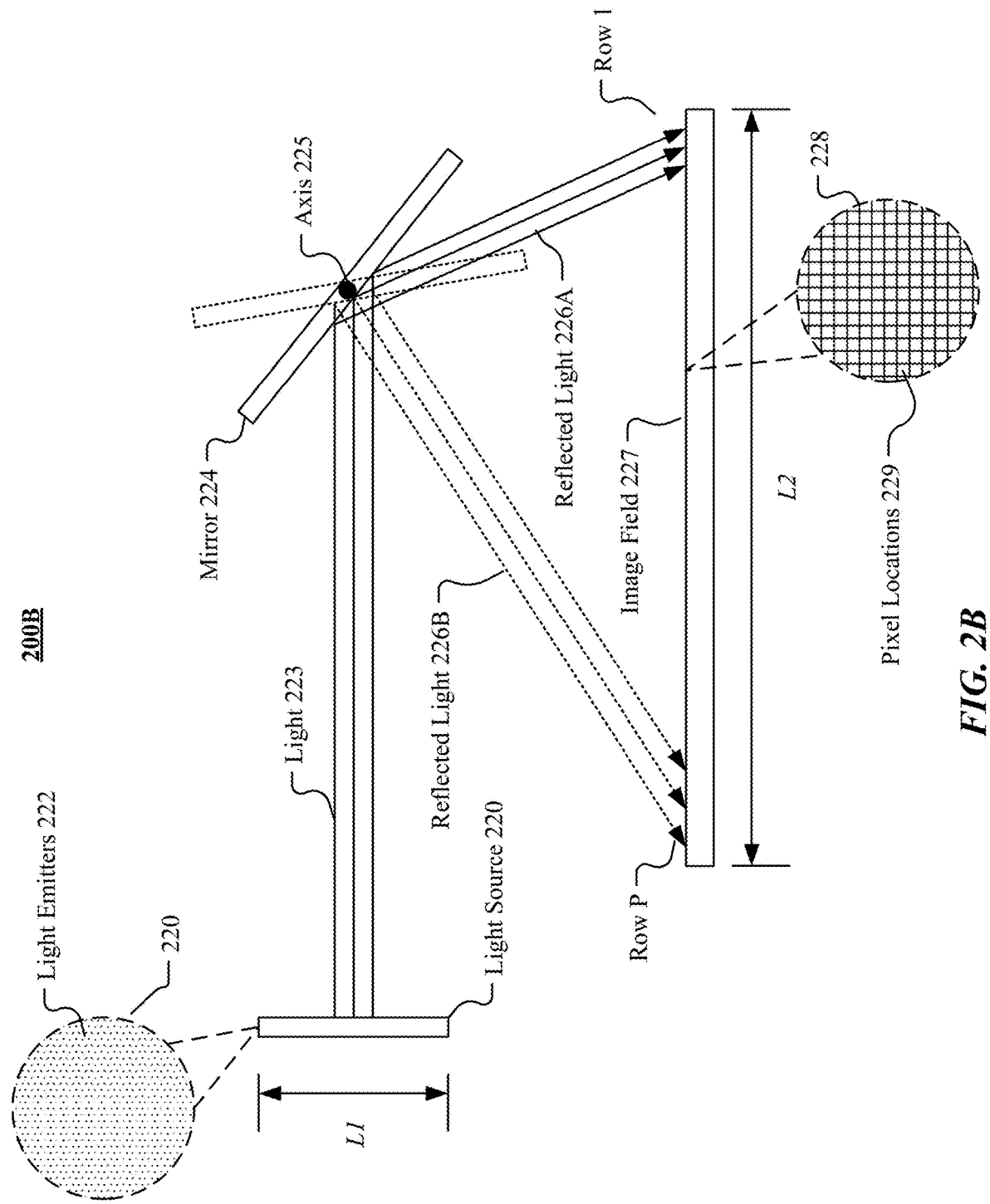
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
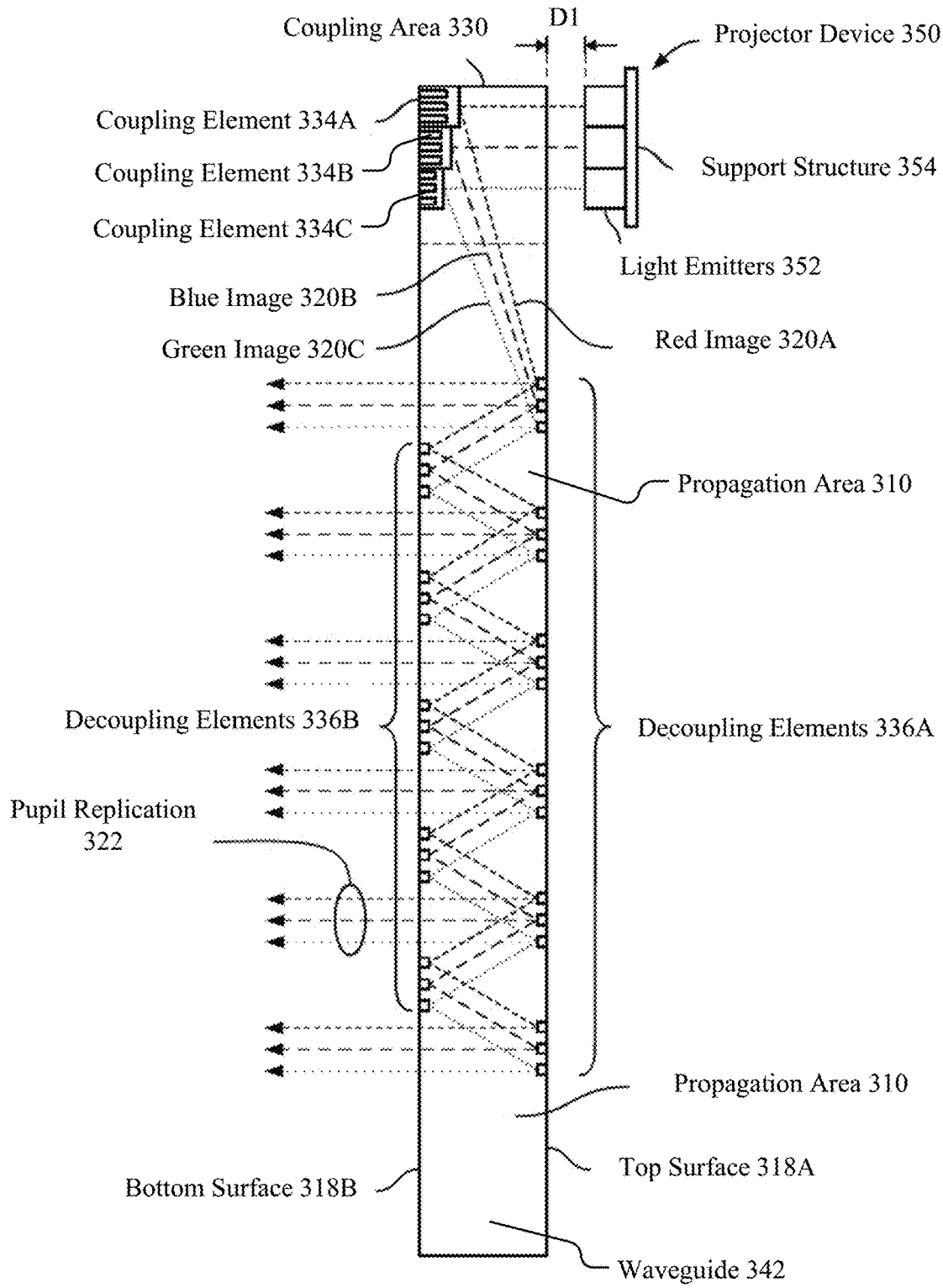
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of DI (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

To improve the displayed image quality, displays with limited color depth or gray scale level may use spatial dithering to spread quantization errors to neighboring pixels and generate the illusion of increased color depth or gray scale level. To further increase the color depth or gray scale level, displays may generate a series of temporal subframe images with less gray level bits to give the illusion of a target image which has more gray level bits. Each subframe image may be dithered using spatial dithering techniques within that subframe image. The average of the series of subframe image may correspond to the image as perceived by the viewer. For example, for display an image with 8-bit pixels (i.e., 256 gray level), the system may use four subframe images each having 6-bit pixels (i.e., 64 gray level) to represent the 8-bit target image. As another example, an image with 8-bit pixels (i.e., 256 gray level) may be represented by 16 subframe images each having 4-bit pixels (i.e., 16 gray level). This would allow the display system to render images of more gray level (e.g., 8-bit pixels) with pixel circuits and supporting hardware for less gray level (e.g., 6-bit pixels or 4-bit pixels), and therefore reduce the space and size of the display system.

Figure 4A:
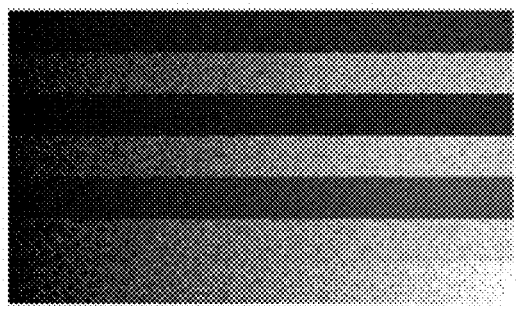
FIG. 4A illustrates an example target image to be represented by a series of subframe images with less color depth.
Figure 4B:
FIGS. 4B-E illustrate four example subframe images generated using segmented quantization and spatial dithering method to represent the target image.
Figure 4C:
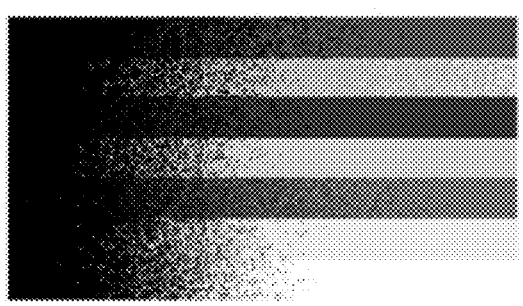
Figure 4D:
Figure 4E:
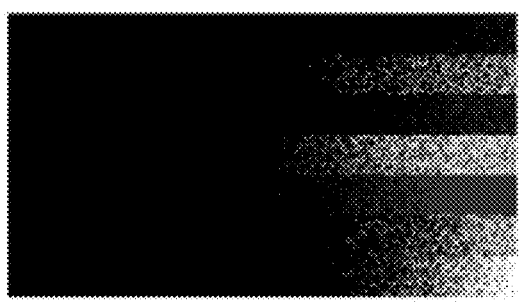

FIG. 4A illustrates an example target image 400A to be represented by a series of subframe images with less color depth. FIGS. 4B-E illustrate four example subframe images 400B-E generated using segmented quantization and spatial dithering method to represent the target image 400A. The target image 400A may have more gray level bits than the physical display. The subframe images 400B-E may have gray level bits corresponding to the physical display, which is less than the target image 400A, and may be used to represent the target image using the time average as perceived by viewers. In general, if a target image has M-bit gray level bits, the subframe images have K-bit gray level bits, and the series of subframe images comprise N number of subframe images, the subframe images and the target image may have a relationship satisfying: $2^M=N\times 2^K$. As an example and not by way of limitation, the image 400A may have 3-bit gray level bits (i.e., 8 gray levels) and the 4 subframe images 400B-E may have 1-bit gray level bits (i.e., 2 gray levels) satisfying $2^3=4\times 2^1$. To generate each subframe image, the value of each pixel in the target image may be quantized according to a series of segmented value ranges corresponding to the weighted value ranges of the subframe images. Each subframe image may correspond to a segmented portion (e.g., a quarter) of the pixel range of the target image. The pixel value range of each subframe image may be weighted according to the corresponding segmented portion of the target image pixel range.

Figure 4F:
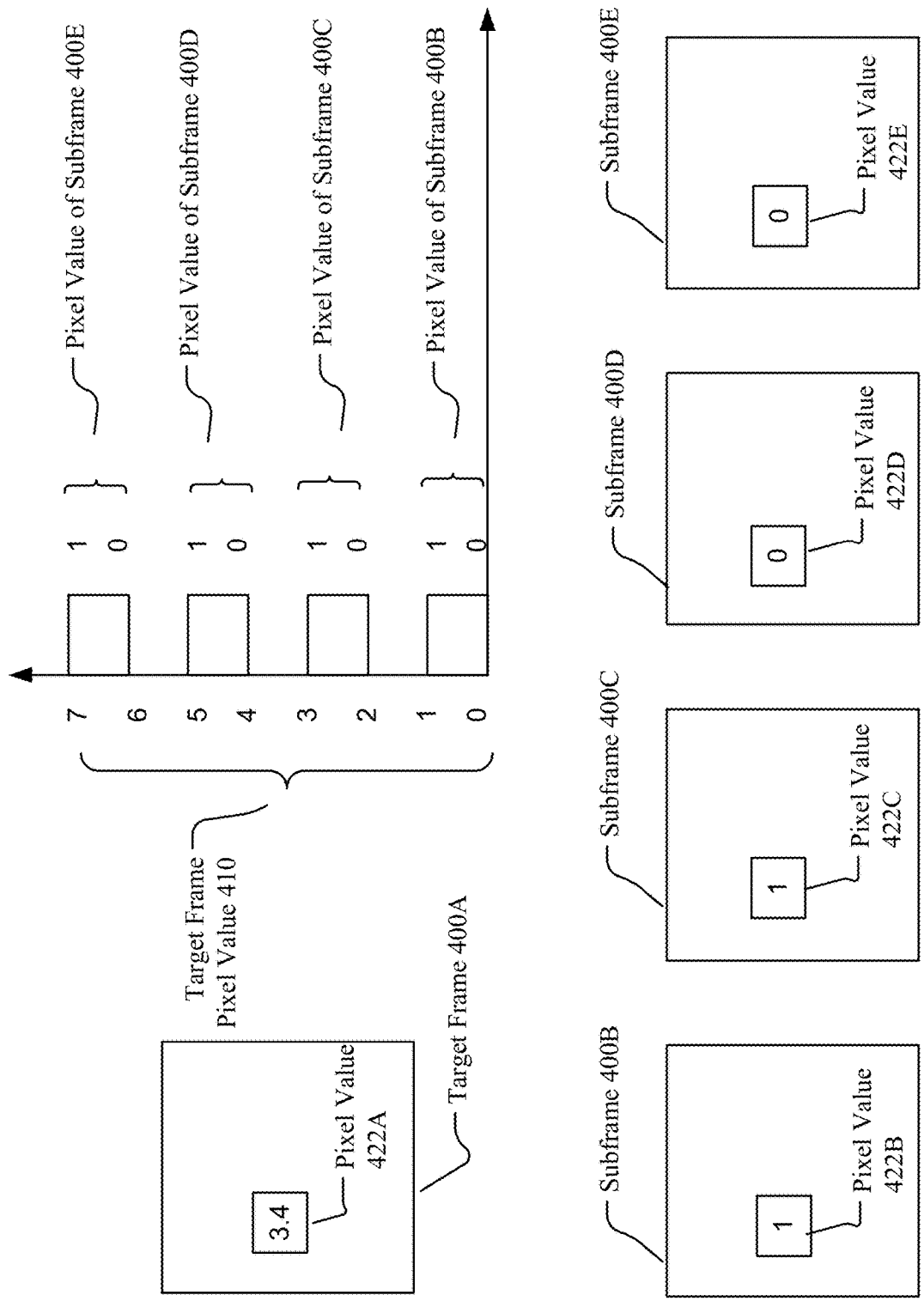
FIG. 4F illustrates an example process for mapping a target pixel value to the weighted pixel value ranges of the four subframe images.

FIG. 4F illustrates an example process for mapping a target pixel value 442A to the weighted pixel value ranges of the four subframe images 400B-E. The 3-bit pixel of the target image 400A may have a value range of [0, 7]. The four weighted pixel value ranges of the four subframe images 400B-E may each correspond to a quarter of the pixel range of the target image 400A. The subframe images 400B-E may each capture a different level of energy bits of the target image 400A. For example, the first subframe image 400B may capture the lowest energy bits of the target image. The second, third, and fourth subframe image 400C-E may each capture higher energy bits of the target image than the preceding subframe image. As a result, the pixel values 410 of the target image 400A may be quantized and mapped to the corresponding weighted pixel ranges of the four subframe images 400B-E. For example, for a pixel 422A in the target image 400A having a value of 3.4, the corresponding quantized pixel value of the four subframe images 400B-E may be 1, 1, 0, and 0 representing weighted quantized pixel value of 1, 3, 4, and 6. Within each subframe image, the quantization errors may be dithered to the neighboring pixels using spatial dithering methods without considering the temporal properties of the display.

However, using this segmented quantization and spatial dithering method, even though the average luminance of the all subframe images over time is approximately equal to the target image, the subframes 400B-E may have very different luminance, as illustrated in FIG. 4B-E. For example, the subframe image 400B capturing the lower energy bits may be very bright since most pixel value of the target image may exceed the maximum pixel value of the subframe 400B. The subframe image 400E capturing the high energy bits may be very dim because most of the pixel value of the target image 400A may be below the pixel value range of the subframe 400E. This may work well for traditional displays such as LCD/LED displays since the user eyes do not change dramatically between the subframe images. However, it will create temporal artifacts such as flashes or uneven luminance over time in AR/VR system because the user's eyes and head positions may change dramatically between the subframe images while wearing AR/VR headset, and will negatively impact the quality of the displayed images and user experiences on the AR/VR system.

Figure 5A:
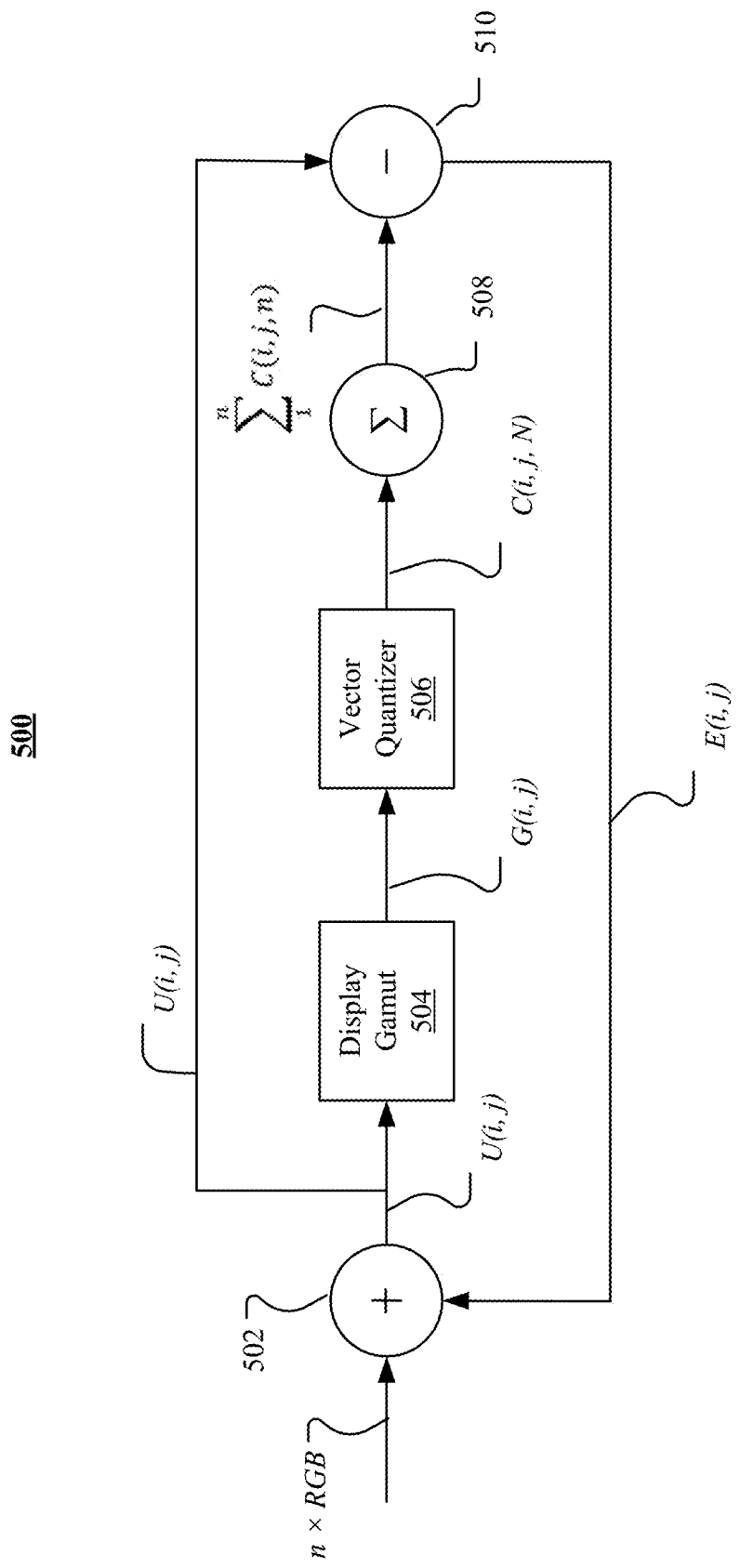
FIG. 5A illustrates an example spatio-temporal dithering model for generating a series of subframe images with more even luminance for representing a target image.

FIG. 5A illustrates an example spatio-temporal dithering model 500A for generating a series of subframe images with more even luminance for representing a target image. In particular embodiments, the system may use a spatio-temporal dithering model to dither quantization errors to the corresponding pixels of the subsequent subframes in the time domain. For example, the system may determine the quantization error of a pixel of the $(n-1)^{th}$ subframe image of the series of subframe images and dither that quantization error to the corresponding pixel of the $n^{th}$ subframe image of the series of subframe images. Through this temporal dithering process, the system may generate subframe images with more evenly distributed energy among the subframe images. Even if the user dramatically changes the eyes or/and head positions between subframe images, the artifacts such as flashes or uneven luminance between subframe images could be reduced or eliminated since each subframe image has approximate the same luminance. In this disclosure, the term "subframe image" may refer to image of a series of images used to represent a target image. However, it is notable that the "subframe image" can be any type of image or any suitable image in any format.

In particular embodiments, the system may generate or receive a target image which is to be displayed to the user. For example, the target image may be a scene of AR/VR content from a movie, game, application, etc. The target image may be in any suitable format and may have any suitable color depth or gray level bits (e.g., 32-bit, 24-bit, 16-bit, 8-bit, 4-bit, 2-bit) per pixel or per color component. The system may use the spatio-temporal dithering process to generate a series of subframe images which may have less gray level bits than the target image and use the series of subframe images to represent the target image. The temporal average of the series of subframe images may approximately equal to the represented target image. Since the viewers of the series of subframe images perceive the temporal average of the series of subframe images, the system may use the series of subframe image displayed sequentially in time domain to effectively represent or approximate the target image. In general, if a target image has M-bit gray level bits, if the subframe images have K-bit gray level bits, and if the series of subframe images include N number of subframe images, the subframe images and the target image may have a relationship satisfying $2^M=N\times 2^K$. As an example, a target image having 3-bit gray level bits (i.e., 8 gray levels) can be represented by 4 subframe images with 1-bit gray level bits (i.e., 2 gray levels) satisfying $2^3=4\times 2^1$. As another example, a target image with 8-bit gray level bits (i.e., 256 gray levels) may be represented by four subframe images each having 6-bit gray level bits (i.e., 64 gray levels). As yet another example, an image with 8-bit gray level bits (i.e., 256 gray levels) may be represented by 16 subframe images having 4-bit gray level bits (i.e., 16 gray levels).

In particular embodiments, the system may generate the series of subframe images by determining the value of each pixel (e.g., one by one and row by row) of each subframe image based on the corresponding pixel value of the target image. The system may determine a target pixel value for a pixel of a subframe image based on a corresponding pixel value of the target image and use the spatio-temporal dithering method to determine the corresponding quantized pixel value or display pixel value to be displayed by that pixel. The system may start from the first pixel of the first row and scan through the first row (e.g., from left to right). Then, the system may move the next row of pixels of the target image and repeat the scanning process until the full subframe image is generated. Then, the system may move to the next subframe image and may generate the series of subframe images in a sequential order (e.g., from subframe image 1 to subframe image N).

In particular embodiments, the system may select or generate a target pixel value for the current pixel of the current subframe image which is among a series of subframe images used to represent a target image. The target pixel value may correspond to a corresponding pixel value of the target image. In particular embodiments, the target pixel value may equal to the corresponding pixel value of the target image. In particular embodiments, the target pixel value may equal to a result of multiplying the corresponding pixel value of the target image by a sequential number associated with the image of the series of images. For a given target pixel value, the system may determine an error-modified target pixel value $U(i,j)$ for the current pixel of the current subframe image of the series of subframe images. The error-modified target pixel value $U(i,j)$ may be determined based on the target pixel value and a first quantization error value which is dithered from a preceding subframe image. For example, the error-modified target pixel value $U(i,j)$ may be determined by adding the first quantization error value (which is dithered from a preceding subframe image) to the target pixel value using the addition module 502. In particular embodiments, when the target pixel value equals to the corresponding pixel value of the target image, the error-modified target pixel value $U(i,j)$ may be calculated by $RGB+E(i,j,n-1)$, where RGB is the corresponding pixel value of the target image, $E(i,j,n-1)$ is the first quantization error dithered from the preceding subframe image. In particular embodiments, when the target pixel value equals to a result of multiplying the corresponding pixel value of the target image by a sequential number n associated with the image of the series of images, the error-modified target pixel value $U(i,j)$ may be calculated by $n \times RGB+E(i,j,n-1)$. For the very first subframe image of the series of subframe images, the quantization error $E(i,j,n-1)$ fed into the error-modified target pixel value may be zero since there is no preceding subframe image.

In particular embodiments, after the error-modified target pixel value has been determined, the system may determine a corrected target pixel value $G(i,j)$ by projecting the error-modified target pixel value $U(i,j)$ to a display gamut 504 associated with display system. As an example and not by way of limitation, the projection process may include clipping the error-modified target pixel value $U(i,j)$ to a value range associated with the display gamut 504 to make sure the color of the corrected target pixel value $G(i,j)$ will be within the valid value range of the display gamut 504. As another example, the system may use a scheme in which the pixel value is projected back along a line of constant hue until it is inside the gamut. As yet another example, the system may generate a line which intersects the out-of-gamut pixel and the middle of the lightness axis and project along that line. After the corrected target pixel value $G(i,j)$ has been determined, the system may use a vector quantizer 506 to quantize the corrected target pixel value $G(i,j)$ and determine the quantized pixel value $C(i,j,n)$ for display by the pixel of the current subframe image which has the sequential number of n among the series of subframe images. The quantized pixel value $C(i,j,n)$ may be determined by mapping the corrected target pixel value $G(i,j)$ to a pixel value range as determined by the K-bit gray level bits of the subframe images. The quantized pixel value $C(i,j,n)$ may be the closest K-bit binary number to the corrected target pixel value $G(i,j)$ within the value of range of K-bit binary number. In particular embodiments, the system may map the whole range of the target pixel value to the whole range of the K-bit binary number corresponding to the K-bit gray level bits of the subframe images (instead of mapping a segmented portion of the target pixel value range to the corresponding range of each subframe image as described in FIG. 4F).

In particular embodiments, after the quantized pixel value $C(i,j,n)$ has been determined, the system may determine an aggregated representation a number of quantized pixel values including the quantized pixel value for or displayed by the current pixel of the current image and corresponding pixels of one or more preceding images. In particular embodiments, when the target pixel value equals to a result of multiplying the corresponding pixel value of the target image by a sequential number n associated with the image of the series of images, the aggregated representation of the quantized pixel values may be a sum of the dithered quantized pixel values as determined by $\Sigma_1^n C(i,j,n)$ using the sum module 508, where n is the sequential number of the current subframe image among the series of subframe images. In particular embodiments, when the target pixel value equals to the corresponding pixel value of the target image, the aggregated representation of the quantized pixel values may be an average of the number of quantized pixel values (including the quantized pixel value for or displayed by the current pixel of the current image and corresponding pixels of one or more preceding images). The aggregated representation of the quantized pixel values may capture the temporal information about how much light intensity has been displayed for the current pixel. The aggregated representation of the quantized pixel values may correspond to an effective pixel value as perceived by a viewer of the series of subframe images. The one or more preceding subframe images may correspond to the subframe images that have been dithered including the current subframe image and all subframe images that precedes the current subframe image.

In particular embodiments, after the aggregated representation of the quantized pixel values has been determined, the system may determine a quantization error value $E(i,j)$ of the current pixel of the current subframe image based on the aggregated representation of the quantized pixel values and the error-modified target pixel value. The quantization error value $E(i,j)$ of the current pixel of the current frame may be determined by subtracting the aggregated representation of the quantized pixel values from the error-modified target pixel value $U(i,j)$ of the current pixel of the current subframe image using the subtraction module 510. The quantization error $E(i,j)$ may correspond to the current pixel or a color component (e.g., red, green, blue) of the current pixel.

Figure 5B:
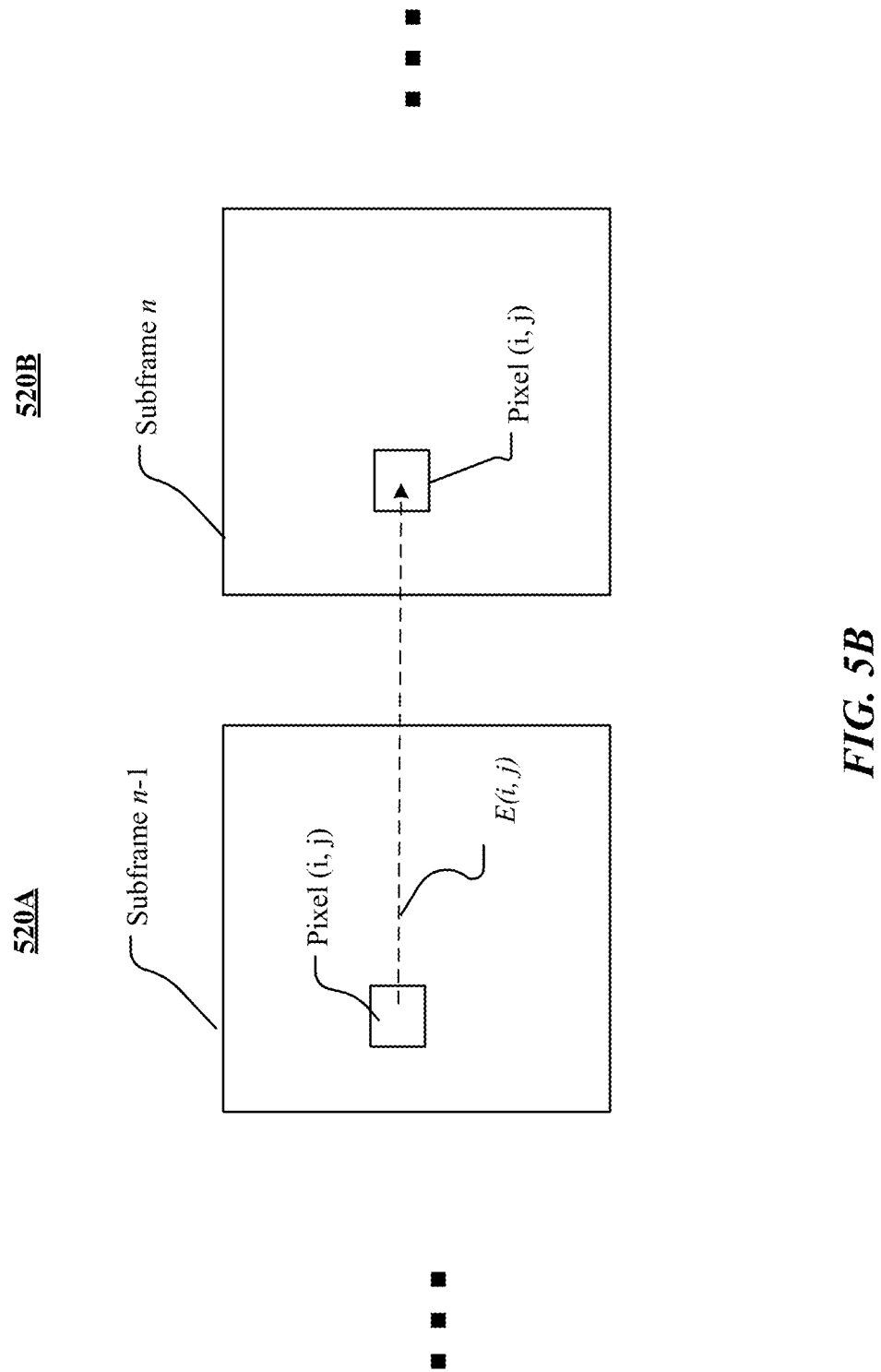
FIG. 5B illustrates an example process for dithering the quantization error temporally from a current subframe image to a next subframe image of the series of subframe images in time domain.

FIG. 5B illustrates an example process for dithering the quantization error temporally from a current subframe image to a next subframe image of the series of subframe images in time domain. After the quantization error value $E(i, i)$ of the current pixel of current subframe image has been determined, the quantization error value $E(i, i)$ may be fed to the input of the spatio-temporal dithering model for determining the value of the corresponding pixel of the next subframe image. The quantization error value $E(i, i)$ may be used for determining the error-modified target pixel value of the corresponding pixel of the next subframe image. In other words, the quantization error of the current pixel of the current subframe image may be dithered to the corresponding pixel of the next subsequent subframe image of the series of subframe images. For a series of subframe images with N number of subframe images in total, the quantization error of a pixel in the $(n-1)^h$ subframe image (e.g., 520A) may be dithered to the corresponding pixel of the $n^{th}$ subframe image (e.g., 520B) until all N subframe images have been dithered. For the very first subframe image of the series of subframe images, the quantization error fed into the error-modified target pixel value may be zero since the first subframe image does not have a preceding subframe image.

In particular embodiments, the system may dither the quantization error both spatially and temporally for generating the series of subframe images with more even luminance distribution. For example, the system may dither at least a portion of the quantization error of the current pixel of the current subframe image temporally to the next subframe and dither the remaining portion of the quantization error spatially to the neighboring pixels of the current pixel within the current subframe image. The proportions of the quantization error to be dithered temporally and spatially may be a pre-determined or may be determined by a spatial or temporal error dithering model. In particular embodiments, the system may use the Floyd-Steinberg model to split the quantization error for spatial and temporal dithering operations.

Figure 6A:
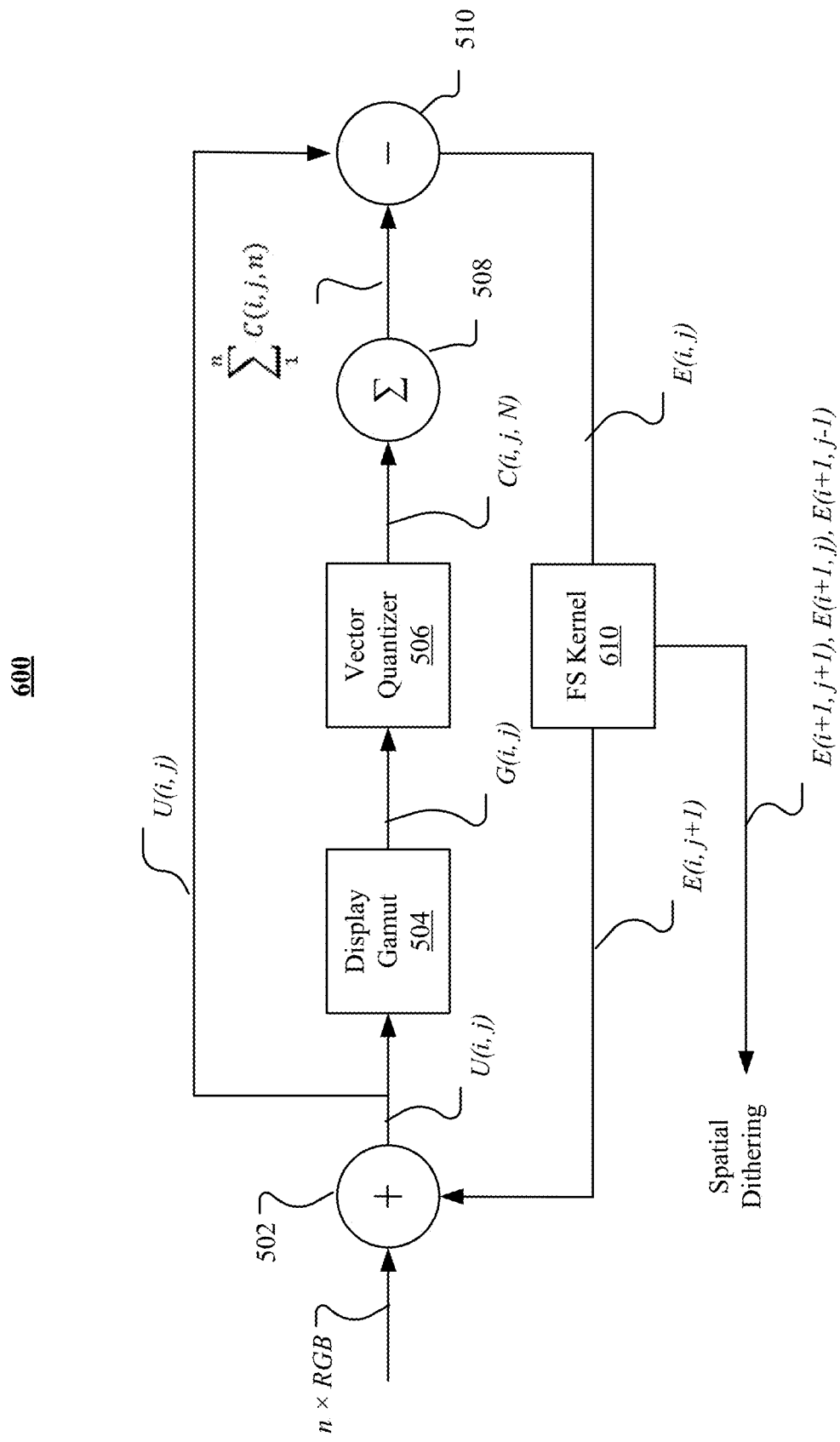
FIG. 6A illustrates an example spatio-temporal dithering model including a Floyd-Steinberg model.

FIG. 6A illustrates an example spatio-temporal dithering model 600 including a Floyd-Steinberg model 610. In particular embodiments, instead of feeding the whole quantization error $E(i,j)$ to the spatio-temporal dithering model for determining the value of the corresponding pixel of the next subframe image, the system may use a spatial dithering model to split the quantization error $E(i,j)$ of the current pixel of the current subframe image into two or more portions for temporal and spatial dithering, respectively. The system may dither a first portion of the quantization error into the corresponding pixel of the next subframe image in time domain and dither the second portion or/and other portions of the quantization error to one or more neighboring pixels of the current pixel within the same subframe image.

As an example and not by way of limitation, the system may feed the quantization error $E(i,j)$ into the Floyd-Steinberg model 610 and determine four spatial errors (e.g., $E(i, j+1)$, $E(i+1, j-1)$, $E(i+1, j)$, $E(i+1, j+1)$) corresponding four adjacent or neighboring pixels of the current pixel. For example, the system may determine a first spatial error value $E(i, j+1)$ corresponding to a first adjacent pixel which is the pixel in the same row and the next column to the current pixel. The first spatial error value may be determined using $E(i,j) \times 7/16$. The system may determine a second spatial error value $E(i+1, j-1)$ corresponding to a second adjacent pixel which is the pixel in the next row and the last column to the current pixel. The second spatial error value may be determined using $E(i,j) \times 3/16$. The system may determine a third spatial error value $E(i+1, j)$ corresponding to a third adjacent pixel which is the pixel in the next row and the same column to the current pixel. The third spatial error value may be determined using $E(i,j) \times 5/16$. The system may determine a fourth spatial error value $E(i+1, j+1)$ corresponding a fourth adjacent pixel which is the pixel in the next row and the next column to the current pixel. The second spatial error value may be determined using $E(i,j) \times 1/16$.

Figure 6B:
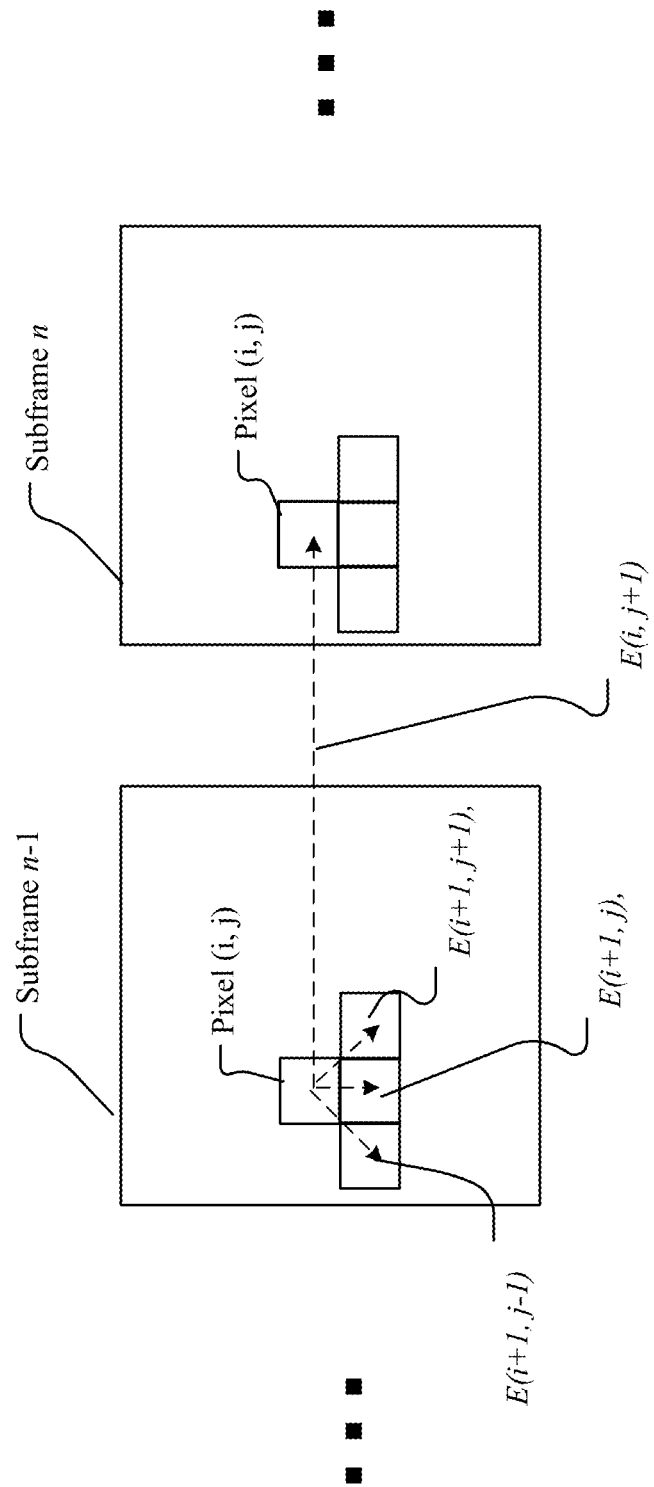
FIG. 6B illustrates an example process for dithering the quantization error both temporally to the next subframe image in time domain and spatially to neighboring pixels in the same subframe image.

FIG. 6B illustrates an example process for dithering the quantization error both temporally to the next subsequent subframe image in time domain and spatially to neighboring pixels in the same subframe image. In particular embodiments, for the $(n-1)^{th}$ subframe image, the system may dither the first spatial error value $E(i, j+1)$ temporally to the corresponding pixel of the $n^{th}$ subframe image. The first spatial error value $E(i, j+1)$ may be fed to the spatio-temporal dithering model for determining the value of the corresponding pixel of the next subframe image. The first spatial error value $E(i, j+1)$ may be used for determining the error-modified target pixel value for the corresponding pixel of the next subframe image of the series of subframe images. In particular embodiments, the system may dither the second, third and fourth spatial error values of $E(i+1, j-1)$, $E(i+1, j)$, $E(i+1, j+1)$ in spatial domain to the second, third and fourth adjacent pixels of the current pixel within the current subframe image. Each spatial error value (e.g., $E(i, j+1)$, $E(i+1, j-1)$, $E(i+1, j)$, $E(i+1, j+1)$) may be stored in a frame buffer corresponding the size of a subframe image and may be dithered to the corresponding pixels of the corresponding subframe image when that subframe image is processed. It is notable that the Floyd-Steinberg model is used herein as an example for determining the portions of the quantization error for spatial and temporal dithering. The portions of the quantization error for spatial and temporally dithering can be any suitable proportion with any suitable weighting factors and is not limited to the Floyd-Steinberg model. In particular embodiments, the system may distribute the light intensity of a target image approximately evenly among all the subframe images of the series of subframe images.

Figure 7:
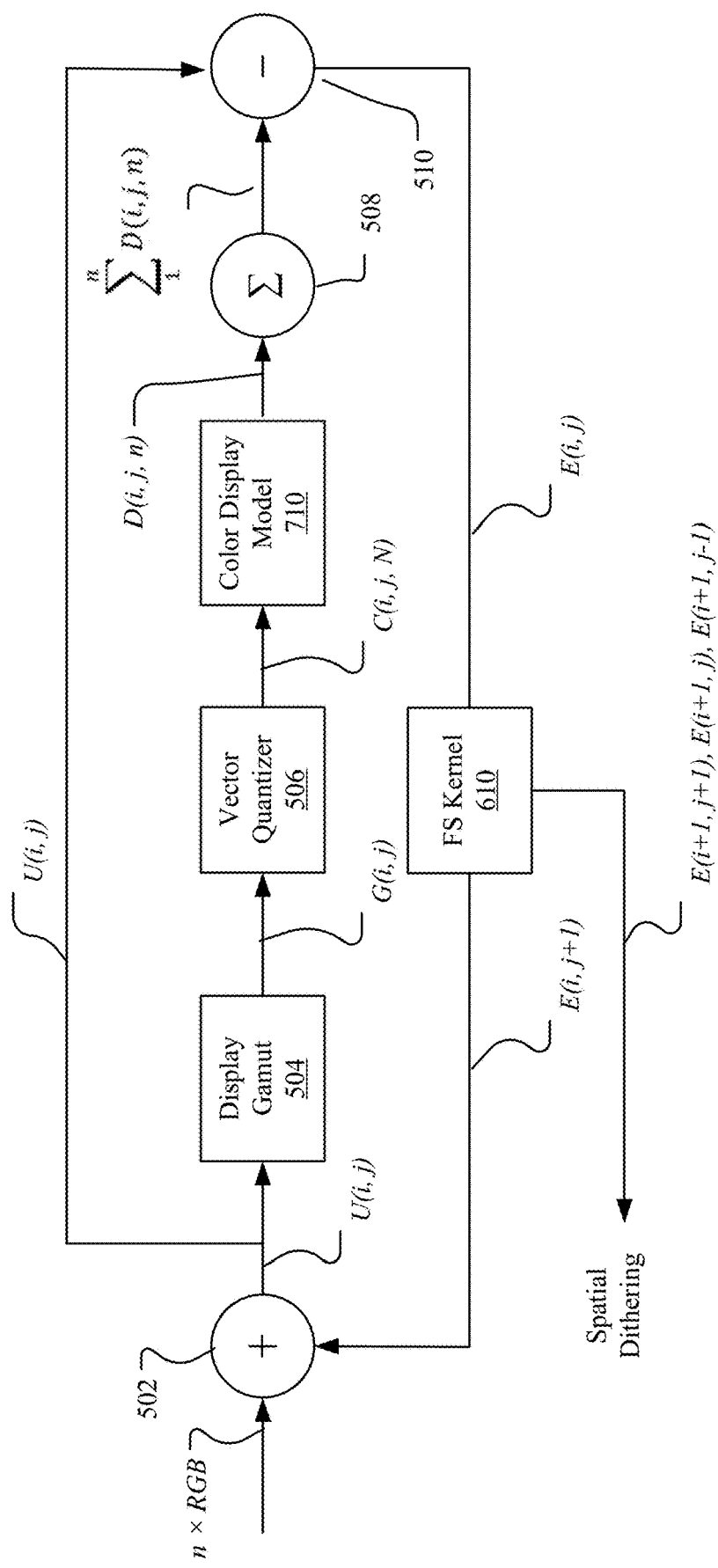
FIG. 7 illustrates an example spatio-temporal dithering model including a Floyd-Steinberg model and a display model.

FIG. 7 illustrates an example spatio-temporal dithering model 700 including a Floyd-Steinberg model 610 and a display model 710. In particular embodiments, the spatio-temporal dithering model 700 may include a color display model 710. After the quantized pixel value $C(i, j, N)$ has been determined, the system may use the color display model 710 to determine the display pixel value $D(i, j, N)$ according the color display model 710 associated with the physical display. The display pixel value $D(i, j, N)$ may be the actual pixel value that will be displayed on the physical display. Then, the system may determine, the aggregated representation of a number of display pixel values corresponding to the same pixel of all the subframe images that have been dithered (including the current subframe image and one or more preceding subframe images). In particular embodiments, when the target pixel value may equal to a result of multiplying the corresponding pixel value of the target image by a sequential number associated with the image of the series of images, the aggregated representation of the display pixel values may be a sum of the display pixel values (e.g., as determined by $XD(i,j,n)$) corresponding to the current pixel of the current subframe and corresponding pixels of preceding subframe images. In particular embodiments, when the target pixel value may equal to the corresponding pixel value of the target image, the aggregated representation of the display pixel values may be average of the display pixel values corresponding to the current pixel of the current subframe and corresponding pixels of preceding subframe images. The quantization error value $E(i,j)$ may be determined by subtracting the aggregated representation of the display pixel values from the error-modified target pixel value $E(i,j)$ using the subtraction module 510.

Figure 8A:
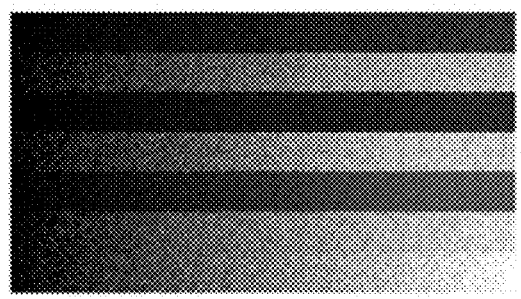
FIG. 8A illustrates an example target image to be represented by a series of subframe images with less gray level.
Figure 8B:
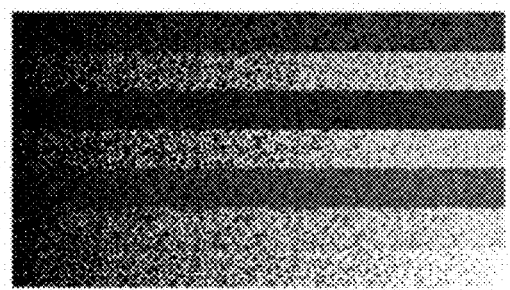
FIGS. 8B-E illustrate four example subframe images generated using the spatio-temporal dithering model.
Figure 8C:
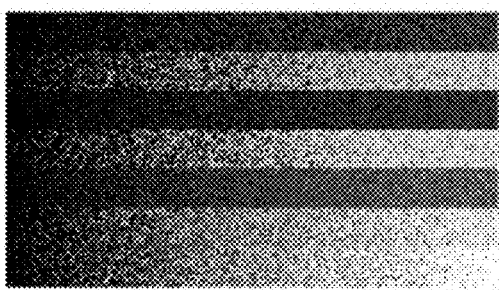
Figure 8D:
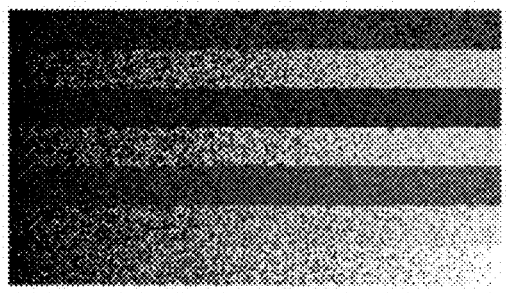
Figure 8E:
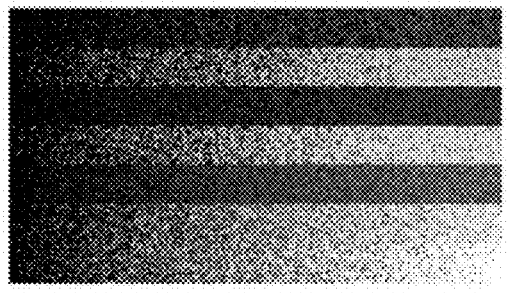

FIG. 8A illustrates an example target image 800A to be represented by a series of subframe images with less gray level. FIGS. 8B-E illustrate four example subframe images 800B-E generated using the spatio-temporal dithering model. By dithering the quantization errors both temporally to the next subframe image in time domain and spatially to neighboring pixels of the same subframe image, the system may generate a series of subframe images with more even distribution of luminance. The target image 800A may have more gray level bits than the physical display. The subframe image 800B-E may have gray level bits corresponding to the physical display and less than the target image 800A. The subframe image 800B-E may be used to represent the target image using the time average as perceived by viewers. In general, if a target image has M-bit gray level bits, the subframe images have K-bit gray level bits, and the series of subframe images comprise N number of subframe images, the subframe images and the target image may have a relationship satisfying: $2^M = N \times 2^K$. As an example, the image 800A may have 3-bit gray level bits (i.e., 8 gray levels) and the 4 subframe images 800B-E may have 1-bit gray level bits (i.e., 2 gray levels) satisfying $2^3 = 4 \times 2^1$. The quantization error $E(i,j)$ of each pixel of the $(n-1)^{th}$ subframe image may be split into four portions (e.g., $E(i, j+1)$, $E(i+1, j-1)$, $E(i+1,j)$, $E(i+1, j+1)$) using the Floyd-Steinberg model. The first quantization error portion $E(i, j+1)$ may be temporally dithered to the corresponding pixel of the $n^{th}$ subframe image and be fed to the spatio-temporal dithering model for determining the error-modified target pixel value for the corresponding pixel of the $n^{th}$ subframe image of the series of subframe images. The second, third and fourth quantization error portions $E(i+1, j-1)$, $E(i+1, j)$, $E(i+1, j+1)$ may be dithered in spatial domain to the second, third and fourth adjacent pixels of the current pixel within the current subframe image. As a result, the subframe image 800B-E may have more even distribution of luminance among the subframe images (e.g., comparing the subframe image 400B-E where there is great luminance contrast among the subframe images.) In particular embodiments, the AR/VR system may use a scanning waveguide displays, 2D micro-LED displays for displaying AR/VR content to users. The spatio-temporal dithering models and methods described in this disclosure are applicable to, but are not limited to, the scanning waveguide display, the 2D micro-LED displays, or any suitable displays for AR/RV systems.

Figure 9:
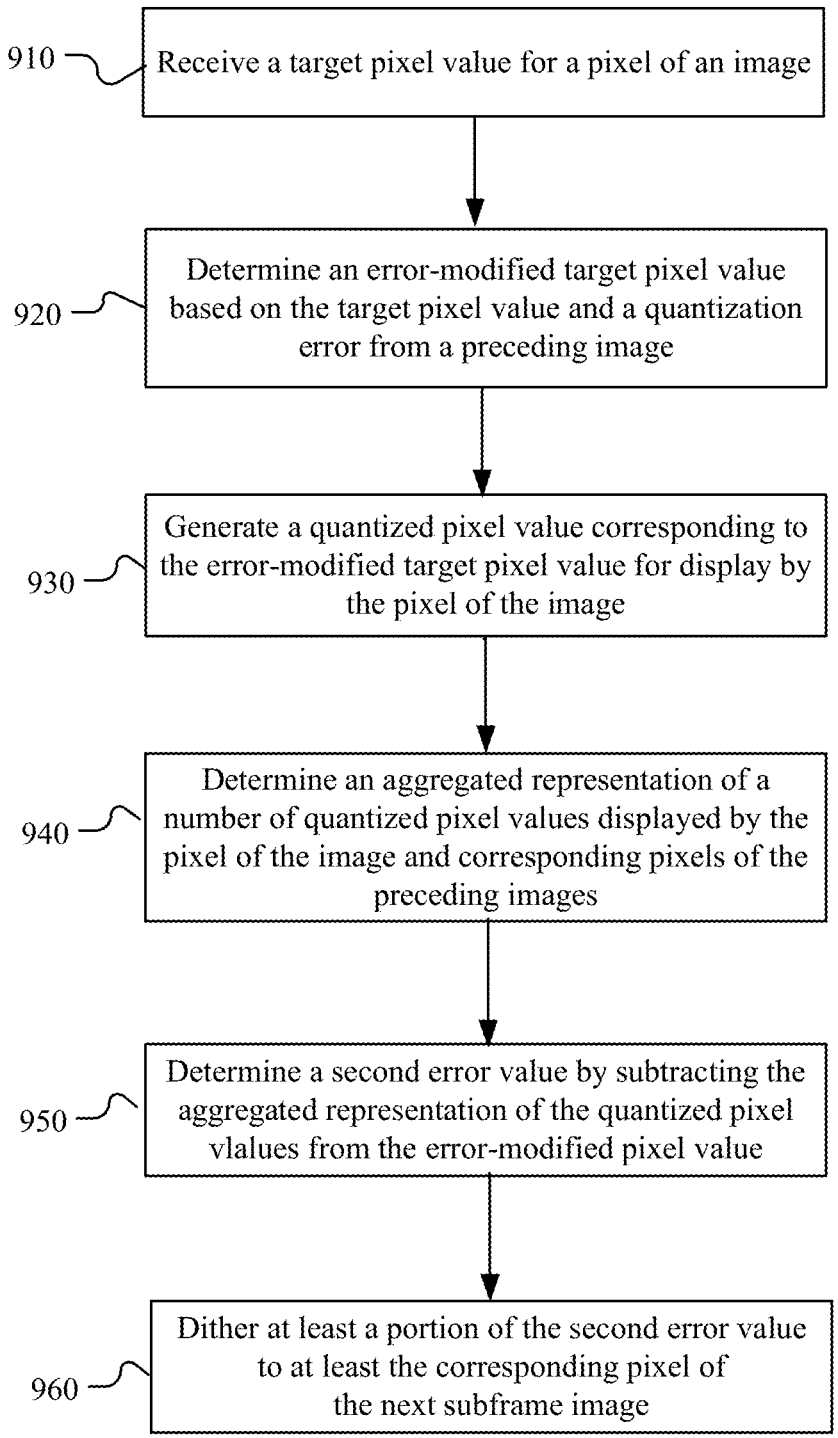
FIG. 9 illustrates an example method for generating a series of images with more even luminance using the spatio-temporal dithering method.

FIG. 9 illustrates an example method 900 for generating a series of images with more even luminance using the spatio-temporal dithering method. The method 900 may begin at step 910, where the system may receive or generate a target pixel value for a current pixel of a current image of a series of images. The series of images may be used to represent a target image. The target pixel value may correspond to a corresponding pixel value of the target image to be represented by the series of the images. In particular embodiments, the target pixel value may equal to the corresponding pixel value of the target image. In particular embodiments, the target pixel value may equal to a result of multiplying the corresponding pixel value of the target image by a sequential number associated with the image of the series of images. When the series of images include N number of images, when each of the series of images has K-bit gray level bits, and when the target image has M-bit gray level bits, the series of images and the target image may satisfy a relationship of $2^M = N \times 2^K$. At step 920, the system may determine a first error-modified target pixel value based on the target pixel value and a first error value. The first error value may be the quantization error value from the corresponding pixel of the preceding image of the series of images. For example, the first error value may be zero when the current image is a first image of the series of images. The first error value may be a preceding quantization error value from the corresponding pixel of a preceding image when the current image is a subsequent image of the series of images. The first error-modified target pixel value may be determined by subtracting the first quantization error value from the target pixel value.

At step 930, the system may determine, using a vector quantizer, a quantized pixel value corresponding to the error-modified value for display by the pixel of the image. In particular embodiments, the system may determine a corrected target pixel value by projecting the first error-modified target pixel value to a display gamut. The projection of the first error-modified target pixel value to the display gamut may include clipping the first error-modified target pixel value to a value range associated with the display gamut. In particular embodiments, the quantized pixel may be determined based on the corrected target pixel value. For example, the quantized pixel value may be determined by mapping the corrected target pixel value to a pixel value range as determined by the gray level bits of the image (e.g., subframe image) of the series of images (e.g., subframe images). If the series of images have K-bit gray level bits, the quantized pixel value may be a closest K-bit binary number to the corrected target pixel value. At step 940, the system may determine a first aggregated representation of a number of quantized pixel values including the pixel value displayed by the current pixel of the current image and the corresponding pixels of one or more preceding images of the series of images that have been dithered. In particular embodiments, the target pixel value may equal to the corresponding pixel value of the target image. In this case, the first aggregated representation of the quantized pixel values may be an average of the quantized pixel values displayed by (1) the pixel of the image and (2) the corresponding pixels of one or more preceding images of the series of images. In particular embodiments, the target pixel value may equal to a result of multiplying the corresponding pixel value of the target image by a sequential number associated with the image of the series of images. In this case, the aggregated representation of the quantized pixel values may be a sum of the quantized pixel values displayed by (1) the pixel of the image and (2) the corresponding pixels of one or more preceding images of the series of images.

At step 950, the system may determine a second quantization error value based on the aggregated representation of the quantized pixel values (displayed by the pixel of the image and the corresponding pixels of one or more preceding images of the series of images) and the error-modified target pixel value. The second quantization error value may be determined by subtracting the aggregated representation of the quantized pixel values from the first error-modified target pixel value. At step 960, the system may dither at least a portion of the second quantization error value to at least the corresponding pixel of the next subframe image. The portion of the second quantization error value dithered to the corresponding pixel of the next image may be used for determining a second error-modified target pixel value for the corresponding pixel of the next image of the series of images.

In particular embodiments, the system may determine, using a spatio-dithering model, one or more spatial error values based on the second quantization error value. For example, the spatio-dithering model may be or include a Floyd-Steinberg kernel. The one or more spatial error values may include a first spatial error value for a first adjacent pixel which is in a same row and a next column to the pixel, a second spatial error value for a second adjacent pixel which is in a next row and a preceding column to the pixel, a third spatial error value for a third adjacent pixel which is in the next row and a same column to the pixel, a fourth spatial error value for a fourth adjacent pixel which is in the next row and the next column to the pixel, etc. In particular embodiments, the first spatial error value may be dithered in a time domain to the corresponding pixel of the next image by being used for determining a second error-modified target pixel value for the corresponding pixel of the next image of the series of images. The second, third and fourth spatial error values may be dithered in a spatial domain to the second, third and fourth adjacent pixels within the image. In particular embodiments, the system may determine, using a color display model, a display pixel value for display by the pixel of the image based on the quantized pixel value. The system may determine, an aggregated representation of the display pixel values displayed by: (1) the pixel of the image and (2) the corresponding pixels of one or more preceding images of the series of images. In particular embodiments, the system may determine the second quantization error value by subtracting the aggregated representation of the display pixel values from the first error-modified target pixel value.

In particular embodiments, the system may include a first digital electronic circuit (e.g., transform block of the display engine) configured to determine one or more areas (e.g., tiles, surfaces, or portions of a surface) of an artificial reality scene that are visible from a current viewpoint of a user. For example, the first digital electronic circuit may use a raycasting method to determine a number of tiles (e.g., each tile corresponding to an array of pixels) that are visible to the user from the current viewpoint. The first digital electronic circuit may determine the tile/surface pairs for determining the corresponding pixels that are visible to the user. The system may include a second digital electronic circuit (e.g., pixel block of the display engine) configured to determine a pixel value for each of a number of pixels associated with the visible areas (e.g., associate with the tile/surface pairs). The system may include a third digital electronic circuit (e.g., display block of the display engine) configured to dither one or more quantization errors associated with the pixels. The quantization errors may be dithered both spatially to one or more neighboring pixels within a current frame and temporally to a corresponding pixel of a next frame. In particular embodiments, the system may include a memory unit (e.g., texture memory) configured to store source data of different resolutions (e.g., MIP map texture data). The pixel values of the pixels associated with the visible areas may be determined based on the source data of different resolutions.

In particular embodiments, the system may include a display system with three color channels of RGB, three display driver circuits for respective three color channels, and one or more data buses connecting the third logic unit to the display driver circuits. In particular embodiments, the display system may include a light source assembly, a number of decoupling elements, and a number of output waveguides coupling the light source assembly to the decoupling elements. In particular embodiments, the display system may include a light source including a number of light emitters emitting a number of light beams, a number of pixels in an image filed, and a rotatable mirror reflecting the light beams to the pixels in the image field. In particular embodiments, the display system may include a projector device emitting a number of light beams, a waveguide including a number of coupling elements and a number of decoupling elements distributed along the waveguide. The coupling elements and the decoupling elements may transmit (e.g., by reflecting) a first portion of light intensity of the light beams along the waveguide. The decoupling elements may decouple a second portion of light intensity of the light beams from the waveguide.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating subframe images with more even luminance using the spatio-temporal dithering method including the particular steps of the method of FIG. 9, this disclosure contemplates any suitable method for generating subframe images with more even luminance using the spatio-temporal dithering method including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
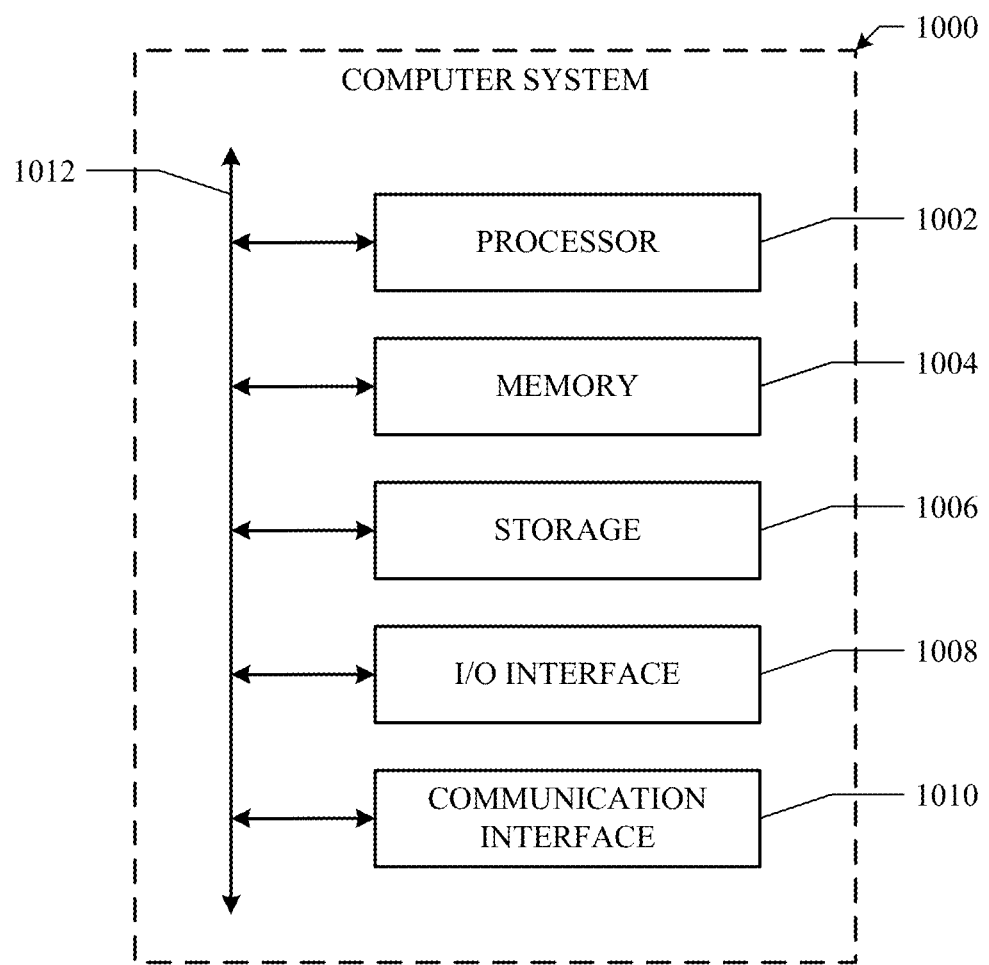
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (IO) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving a target pixel value for a pixel of an image of a series of images;
   determining a first error-modified target pixel value based on the target pixel value and a first error value;
   generating a quantized pixel value corresponding to the error-modified target pixel value, wherein the quantized pixel value is used for display by the pixel of the image;
   determining a first aggregated representation of a plurality of quantized pixel values displayed by: (1) the pixel of the image and (2) corresponding pixels of one or more preceding images of the series of images;
   determining a second error value based on the first aggregated representation of the plurality of quantized pixel values and the first error-modified target pixel value;
   determining, using a spatial-dithering model, a plurality of spatial error values based on the second error value, wherein the plurality of spatial error values corresponds to a plurality of adjacent pixels of the pixel of the image; and
   dithering a spatial error value of the plurality of spatial error values to at least a corresponding pixel of a next image in the series of images.

2. The method of claim 1, wherein the series of images are used to represent a target image, and wherein the target pixel value corresponds to a corresponding pixel value of the target image.

3. The method of claim 2, wherein the target pixel value equals to the corresponding pixel value of the target image, and wherein the first aggregated representation of the plurality of quantized pixel values is an average of the plurality of quantized pixel values.

4. The method of claim 2, wherein the target pixel value equals to a result of multiplying the corresponding pixel value of the target image by a sequential number associated with the image of the series of images, and wherein the first aggregated representation of the plurality of quantized pixel values is a sum of the plurality of quantized pixel values.

5. The method of claim 2, wherein the series of images comprise N number of images, wherein each of the series of images has K-bit gray level bits, wherein the target image has M-bit gray level bits, and wherein the series of images and the target image have a relationship of $2^M = N \times 2^K$.

6. The method of claim 5, further comprising:
   determining a corrected target pixel value by projecting the first error-modified target pixel value to a display gamut, wherein the quantized pixel value is generated based on the corrected target pixel value.

7. The method of claim 6, wherein the projection of the first error-modified target pixel value to the display gamut comprises clipping the first error-modified target pixel value to a value range associated with the display gamut.

8. The method of claim 6, wherein the quantized pixel value is determined by mapping the corrected target pixel value to a pixel value range as determined by the K-bit gray level bits, and wherein the quantized pixel value is a closest K-bit binary number to the corrected target pixel value.

9. The method of claim 1, wherein the second error value is determined by subtracting the aggregated representation of the plurality of quantized pixel values from the first error-modified target pixel value.

10. The method of claim 1, wherein the spatial error value is dithered to the corresponding pixel of the next image of the series of images by being used for determining a second error-modified target pixel value for the corresponding pixel of the next image of the series of images.

11. The method of claim 1, wherein the first error value has a temporal error component that is substantially zero when the image is a first image of the series of images.

12. The method of claim 1, wherein the first error value has a temporal error component corresponding to a preceding error value from the corresponding pixel of a preceding image when the image is a subsequent image of the series of subframe images.

13. The method of claim 1,
wherein the plurality of spatial error values comprises a first spatial error value for a first adjacent pixel which is in a same row and a next column to the pixel, a second spatial error value for a second adjacent pixel which is in a next row and a preceding column to the pixel, a third spatial error value for a third adjacent pixel which is in the next row and a same column to the pixel, and a fourth spatial error value for a fourth adjacent pixel which is in the next row and the next column to the pixel.

14. The method of claim 13, wherein the second, third and fourth spatial error values are dithered in a spatial domain to the second, third and fourth adjacent pixels within the image.

15. The method of claim 1, wherein the spatio-dithering model comprises a Floyd-Steinberg kernel.

16. The method of claim 1, wherein the first spatial error value is dithered in the time domain to the corresponding pixel of the next image by being used for determining a second error-modified target pixel value for the corresponding pixel of the next image of the series of images.

17. The method of claim 1, further comprising:
determining, using a color display model, a display pixel value based on the quantized pixel value for display by the pixel of the image; and
determining, a second aggregated representation of the plurality of display pixel values displayed by: (1) the pixel of the image and (2) the corresponding pixels of one or more preceding images of the series of images, wherein the second error value is determined by subtracting the second aggregated representation of the plurality of display pixel values from the first error-modified target pixel value.

18. One or more computer-readable non-transitory storage media embodying software that is operable when executed to:
receive a target pixel value for a pixel of an image of a series of images;
determine a first error-modified target pixel value based on the target pixel value and a first error value;
generate a quantized pixel value corresponding to the error-modified target pixel value, wherein the quantized pixel value is used for display by the pixel of the image;
determine a first aggregated representation of a plurality of quantized pixel values displayed by: (1) the pixel of the image and (2) corresponding pixels of one or more preceding images of the series of images;
determine a second error value based on the first aggregated representation of the plurality of quantized pixel values and the first error-modified target pixel value;
determine, using a spatial-dithering model, a plurality of spatial error values based on the second error value, wherein the plurality of spatial error values corresponds to a plurality of adjacent pixels of the pixel of the image; and
dither a spatial error value of the plurality of spatial error values to at least a corresponding pixel of a next image in the series of images.

19. A system comprising:
one or more processors; and
one or more computer-readable non-transitory storage media coupled to one or more of the processors and comprising instructions operable when executed by one or more of the processors to cause the system to:
receive a target pixel value for a pixel of an image of a series of images;
determine a first error-modified target pixel value based on the target pixel value and a first error value;
generate a quantized pixel value corresponding to the error-modified target pixel value, wherein the quantized pixel value is used for display by the pixel of the image;
determine a first aggregated representation of a plurality of quantized pixel values displayed by: (1) the pixel of the image and (2) corresponding pixels of one or more preceding images of the series of images;
determine a second error value based on the first aggregated representation of the plurality of quantized pixel values and the first error-modified target pixel value;
determine, using a spatial-dithering model, a plurality of spatial error values based on the second error value, wherein the plurality of spatial error values corresponds to a plurality of adjacent pixels of the pixel of the image; and
dither a spatial error value of the plurality of spatial error values to at least a corresponding pixel of a next image in the series of images.

* * * * *